United States Patent
Bhandari et al.

(10) Patent No.: US 10,853,868 B2
(45) Date of Patent: Dec. 1, 2020

(54) SYSTEM AND METHOD FOR CONFIGURING THE DISPLAY OF SALE ITEMS RECOMMENDED BASED ON CUSTOMER NEED AND HEURISTICALLY MANAGING CUSTOMER NEED-BASED PURCHASING RECOMMENDATIONS

(71) Applicant: Dell Products, LP, Round Rock, TX (US)

(72) Inventors: Rahul Bhandari, Round Rock, TX (US); Prashant S. Sonewane, Bangalore (IN); Anand Satya Bhaskar, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 456 days.

(21) Appl. No.: 15/598,760

(22) Filed: May 18, 2017

(65) Prior Publication Data
US 2018/0336619 A1   Nov. 22, 2018

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0641* (2013.01)

(58) Field of Classification Search
CPC .............................................. G06Q 30/06–08
(Continued)

(56) References Cited

U.S. PATENT DOCUMENTS 8,065,353 B2 * 11/2011 Eckhoff-Hornback ...................... G06Q 10/087
705/14.65
8,468,155 B2   6/2013 Sureka
(Continued)

FOREIGN PATENT DOCUMENTS

WO   2015/191080 A1   12/2015
WO   2017/013667 A1   1/2017

OTHER PUBLICATIONS

Lenovo, Lenovo Official US Store Website / Laptops, Tablets, Computers, PCs, 3 pages, Jan. 2017, https://www3.lenovo.com/us/en.
(Continued)

*Primary Examiner* — Ethan D Civan
(74) *Attorney, Agent, or Firm* — Prol Intellectual Property Law, PLLC; H. Kenneth Prol

(57) ABSTRACT

A system and method operating a customer need-based configuration recommendation management system to enhance configuration selection comprising processor executing machine readable executable code instructions to define a plurality of preset user functional requirement definitions for a configuration of one or more sale items to configure an on-sale custom information handling system available via a web interface, wherein the each of the plurality of preset user functional definitions corresponds to one of a plurality of need-based categories of customers, and a stored plurality of list configurations, each of the plurality of list configurations including a configuration of sale items associated with one of the plurality of preset user functional definitions, wherein each of the sale items have a different sale item type from one another and are identified as being compatible with one another according to compatibility data stored in memory. The system and method provide for a graphical web interface to receive a first user input selecting
(Continued)

a first one of the plurality of preset functional requirement definitions for a first corresponding need-based category and a configurator for the first need-based category to present one of the plurality of stored list configurations including a configuration of sale items associated with the first selected functional requirement definition and prompt the user to select for purchase the presented configuration of sale items which updates a plurality of accuracy counter variables assigned to the association between each of the sale items presented and the first selected functional requirement definition.

6 Claims, 14 Drawing Sheets

(58) Field of Classification Search
USPC .............................................. 705/26.1–27.2
See application file for complete search history.

(56) References Cited

U.S. PATENT DOCUMENTS

| | | |
|---|---|---|
| 8,762,214 B1 | 6/2014 | Daniel |
| 2016/0110794 A1 | 4/2016 | Hsiao |

OTHER PUBLICATIONS

Cisco Systems, Cisco Official Products and Services Website, 8 pages, Jan. 2017, https://www.cisco.com/c/en/us/products/index.html#~stickynav=1.
Siemens AG, Siemens Global Official Website, 5 pages, Jan. 2017, https://www.siemens.com/global/en/home.html.
Rockwell Automation, Inc., Rockwell Automation Official Products Website, 3 pages, Jan. 2017, https://www.rockwellautomation.com/global/products/overview.page.
Hp Development Company, L.P., HP Official US Store Website, 9 pages, Jan. 2017, http://store.hp.com/?jumpid=ps_gen_nc_ns&utm_medium=ps&utm_source=ga&utm_campaign=Core-Brand_Brand_OPEX_Search_Exact&utm_term=hp%20products&matchtype=e&adid=225369195093&addisttype=g&gclid=CjwKCAjwmefOBRBJEiwAf7DstlkmTwNQf4eZ0qvatsxw_TN4aLK9Y7hXcoe-6flBEIg1i4y4qvSerxoCXAsQAvD_BwE.
BMW AG, BMW Official US Model Store Website, 10 pages, Jan. 2017, https://www.bmw.com/en/all-models.html.
Ferrari N.V., Ferrari Official Website, 1 page, Jan. 2017, http://car-configurator.ferrari.com/california-t#config/1|40400|10400000|c00020|60000000|40201||80000002|e00||140|||||||||||10400|7f7fff4c|3.

* cited by examiner

MEMORY DEVICES PRODUCT OR SERVICE
CATEGORY TABLE

200

| MEMORY PRODUCTS | EDUCATION; HEALTHCARE; FINANCE; ENGINEERING; | | NORAM; APAC | | |
|---|---|---|---|---|---|
| List Price | Compatibility Options | Description | INDUSTRY TAG | REGION TAG | Accuracy Counter Variable |
| $40 | Optiplex 3040 Desktop | 4GB (1x4G) 1600 MHz DDR3L Memory | EDUCATION |  | 35K |
| $40 | Optiplex 3040 Desktop | 4GB (1x4G) 1600 MHz DDR3L Memory | HEALTHCARE | NORAM | 10K |
| $260 | Optiplex 3040 Desktop | 16GB (2x8G) 1600 MHz DDR3L Memory | HEALTHCARE | NORAM | 20K |
| $130 | Optiplex 3040 Desktop | 8GB (1x8G) 1600 MHz DDR3L Memory | HEALTHCARE | APAC | 30K |
| $130 | Optiplex 3040 Desktop | 8GB (1x8G) 1600 MHz DDR3L Memory |  | NORAM | 25K |
| $260 | Optiplex 3040 Desktop | 16GB (2x8G) 1600 MHz DDR3L Memory | FINANCE |  | 15K |
| $260 | Optiplex 3040 Desktop | 16GB (2x8G) 1600 MHz DDR3L Memory | ENGINEERING | APAC | 27K |
| $40 | Optiplex 560 Desktop | 4GB (1x4G) 1600 MHz DDR3L Memory | HEALTHCARE | NORAM | 40K |

FIG. 2

TECHNICAL SUPPORT PRODUCT OR SERVICE CATEGORY TABLE

300

| TECHNICAL SUPPORT SERVICES | | EDUCATION; ENTERTAINMENT; FINANCE; | | NORAM; APAC; IMEA | |
|---|---|---|---|---|---|
| List Price | Compatibility Options | Description | INDUSTRY TAG | REGION TAG | Accuracy Counter Variable |
| $300 | Optiplex 3040 Desktop | ProSupport PLUS | EDUCATION | | 1TK |
| $300 | Optiplex 3040 Desktop | ProSupport PLUS | ENTERTAINMENT | IMEA | 10K |
| $300 | Optiplex 3040 Desktop | ProSupport PLUS | ENTERTAINMENT | NORAM | 20K |
| $300 | Optiplex 3040 Desktop | ProSupport PLUS | ENTERTAINMENT | APAC | 30K |
| $300 | Optiplex 3040 Desktop | ProSupport PLUS | FINANCE | | 15K |
| $300 | Optiplex 3040 Desktop | ProSupport PLUS | | APAC | 25K |
| $100 | Optiplex 560 Desktop | ProSupport | ENTERTAINMENT | IMEA | 5K |

FIG. 3

US 10,853,868 B2

SYSTEM AND METHOD FOR CONFIGURING THE DISPLAY OF SALE ITEMS RECOMMENDED BASED ON CUSTOMER NEED AND HEURISTICALLY MANAGING CUSTOMER NEED-BASED PURCHASING RECOMMENDATIONS

FIELD OF THE DISCLOSURE

The present disclosure generally relates to information handling systems, and more particularly relates to a system for managing customer need-based recommendations of items for purchase, and for heuristically adapting customer need-based purchasing recommendations based on customer purchasing actions.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. The information handling system may include telecommunication, network communication, and video communication capabilities. Further, the information handling system may provide web access to data and include a graphical web interface for directing electronic purchase of sale items.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 2 is a graphical illustration of a product or service category table according to an embodiment of the present disclosure;

FIG. 3 is a graphical illustration of a product or service category table according to an embodiment of the present disclosure;

The use of the same reference symbols in different drawings may indicate similar or identical items.

DETAILED DESCRIPTION OF THE DRAWINGS

Figure 1:
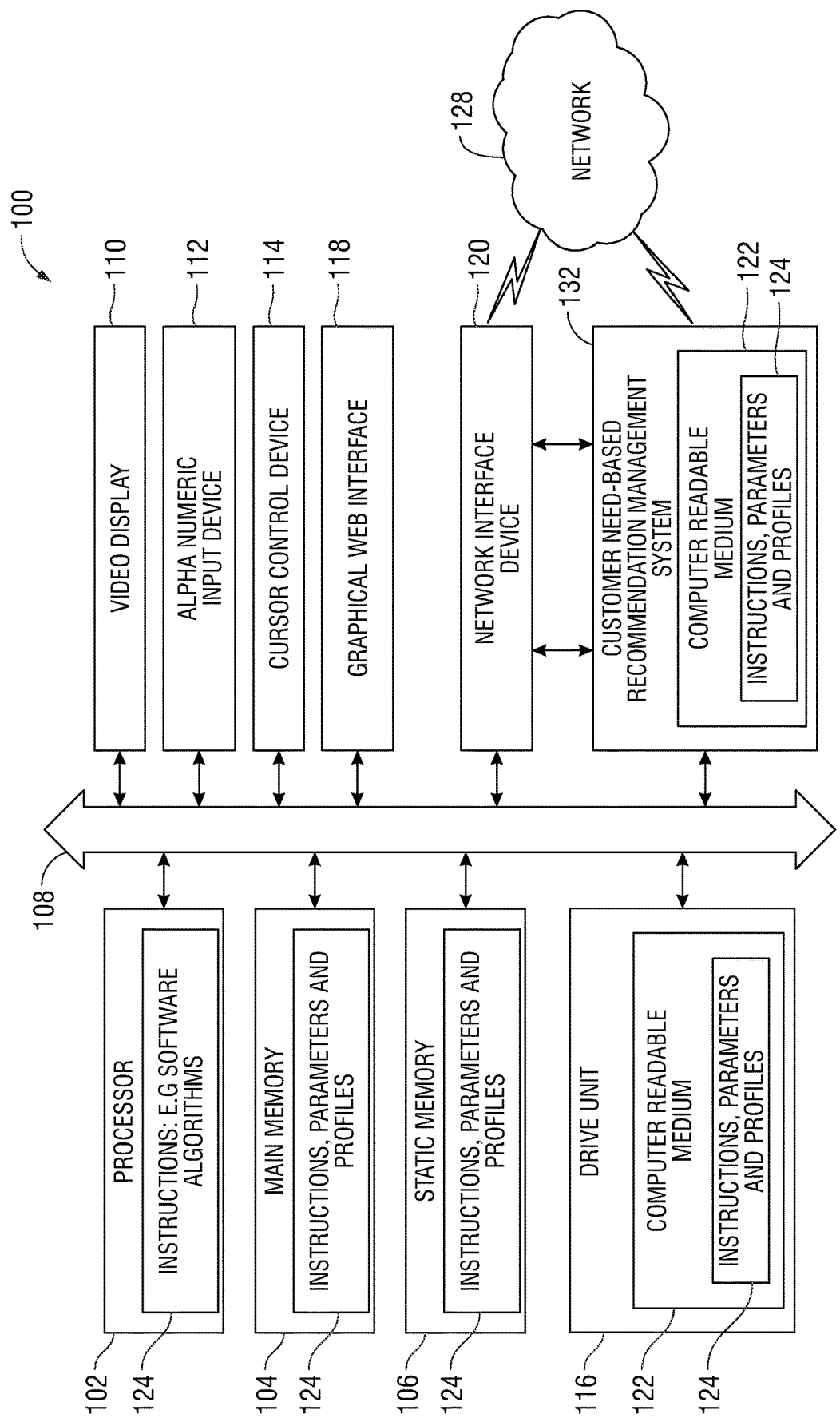
FIG. 1 is a block diagram illustrating a generalized embodiment of an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

E-commerce has become an important tool for small and large businesses worldwide, not only to sell to customers, but also to engage them and to better understand their needs. The use of e-commerce allows online merchants to gather data regarding purchase activity and interests of their customers, and to use that data to enhance customer experience when purchasing sale items via web-based graphical user interfaces (GUIs). In addition, the use of e-commerce offers consumers virtually unlimited information about items available for purchase. However, an over abundance of information provided by a merchant may lead to consumer confusion and overwhelm the user. Previous systems provided lists of options, but the selection of options were confusing and could be contradictory. In particular, previous systems may make a recommendation, but that recommendation may not have been based on an anticipation of a user's needs for a product. Further, in sales of information handling systems of a variety to types, even when an abundance of options for sale items or services are offered, the range of options can become confusing to a user since they are not necessarily tailored for the user. Adding to the issue, the variety of possible users and the needs of those users who are customers for information handling systems may be equally varied. Previous e-commerce solutions have not been up to the task. A solution is needed to steer consumers toward sale items that will likely closely align with a user's needs, and to heuristically and adaptively determine what each user's needs are based on user description.

Embodiments of the present disclosure provide a solution to each of these problems through the use of a customer need-based recommendation management system and method for heuristically and adaptively configuring a graphical user interface to prompt consumers to purchase sale items based on perceived customer need. Users of an e-commerce GUI in such embodiments may provide input indicating the user meets a specific description with respect to one or more need-based categories previously determined to drive customer demand for a type of sale item or for a specific sale item. Example need-based categories may include user industry or region.

By selecting one of multiple preset functional requirement descriptions associated with a need-based category, a user may provide input that the customer need-based recommendation management system may use to select a sale item most likely to meet that user's need. Example preset functional requirement descriptions may include specific user industries such as entertainment, engineering, healthcare, education, or finance, or may include specific user regions, such as NORAM (U.S., Canada, Mexico), APAC (Asia-Pacific), or IMSA (India, Middle-East, and Africa). The type of industry or region in which the consumer works may influence the determination of one or more sale items most likely to meet that user's needs. For example, a consumer purchasing a information handling system via an e-commerce GUI for use in the education industry in North America may need a device with far less computing power than an engineer working in the Asia-Pacific region. As another example, an engineer working in the Asia-Pacific region may need less IT support than a consumer in the education industry in North America. Configuring the GUI to only display sale items likely to meet the user's specific needs, as determined based on the user's self-description of falling within a functional requirement description within the one or more need-based categories may result in less clutter of information on the GUI, less consumer confusion, and an enhanced customer experience.

In embodiments of the present disclosure, each of the sale items or services to be combined in an embodiment to create a single product or service configured especially for customers falling within a selected preset functional description may be presented within a configuration list. For example, a memory device, a processor, as well as other components or services may be combined within a configuration list that includes all components or services that combine to create product customized for use in the industry or region in which the user has indicated she works. A configuration list corresponding to each preset functional description requirement and/or each combination of a plurality of preset functional description requirements may be stored in memory.

Embodiments of the present disclosure also provide a heuristic and adaptive solution to managing recommendations based on a customer's needs by constantly measuring the accuracy of the selection of the sale item most likely to meet a specific need. As described above, the GUI may receive input associating a user with a preset functional requirement definition, such as, for example, the region or industry in which the user may work. As also described above, the customer need-based recommendation management system in embodiments of the present disclosure may determine which sale item(s) are associated with the preset functional requirement definition, and thus, most likely to meet that customer's specific needs. The goal of these determinations—to enhance the customer experience by providing accurate recommendations of sale items suitable to each user's needs—hinges on the accuracy of these recommendations. For example, if the customer need-based recommendation management system configures the GUI to display for purchase information handling systems that are quicker, more powerful, and thus more expensive than the customer really needs, the customer may perceive that the merchant is attempting to sell them an unnecessarily high-priced item, thereby eroding consumer trust and disrupting what could have been a positive consumer experience. On the other hand, and as another example, if the customer need-based recommendation management system configures the GUI to display for purchase information handling systems that are slower, not as powerful, and cheaper than what the consumer really needs, not only does the consumer again have a negative experience, but the merchant has also missed an opportunity to sell the higher priced item that the user actually needs, resulting in a loss of opportunity for sale.

Embodiments of this disclosure solve this problem by including a method for continuously assessing and updating the accuracy of each determination of the sale item most likely to meet the preset functional requirement descriptions associated with customer need-based categories. As described above, the customer need-based recommendation management system in embodiments of this disclosure may determine which sale items are most likely to meet the customer's needs based on user input indicating the user meets one or more functional requirement descriptions. This determination may involve associating the selected functional requirement definitions with a sale item. The customer need-based recommendation management system may then configure the GUI to display for purchase only the sale item associated with that user's one or more functional requirement descriptions.

The method for continuously assessing the accuracy of each determination of recommended sale items may further include assigning an accuracy counter variable to each association between a sale item and a preset functional requirement definition, and adjusting the accuracy counter variable based on an observation of whether the consumer purchases the recommended sale item, or purchases another sale item instead. For example, if the user purchases the recommended sale item, customer need-based recommendation management system may increase by an increment of one the accuracy counter variable assigned to the association between the recommended sale item and the preset functional requirement description associated with the need-based category selected by the user. As another example, if the user purchases a sale item other than the recommended sale item, the customer need-based recommendation management system may decrease the accuracy counter variable assigned to the association between the sale item and the preset functional requirement definition associated with the need-based category selected by the user by an increment of one. As the customer need-based recommendation management system gathers more information about the accuracy of its determinations of sale items most likely to meet specific customer needs, it may begin to recommend sale items associated with the highest accuracy counter variable, thus increasing the accuracy of those recommendations. Further, by gathering more information about the sale items most likely to be purchased by users falling into certain need-based categories, such as, for example, user industry or region, the customer need-based recommendation management system may provide sales metrics merchants can use to guide product development and targeted advertising campaigns toward higher profit strategies.

Examples are set forth below with respect to particular aspects of an information handling system for configuring the display of sale items recommended based on customer need and heuristically managing customer need-based purchasing recommendations.

FIG. 1 illustrates an information handling system 100 similar to information handling systems according to several aspects of the present disclosure. For example, an information handling system 100 may be any mobile or other information handling system capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets of instructions to perform one or more computer functions.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the customer need-based recommendation management system 132, and drive unit 116 (volatile (e.g. random-access memory, etc.), non-volatile (read-only memory, flash memory etc.) or any combination thereof). The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and a cursor control device 114, such as a mouse, touchpad, or gesture or touch screen input.

The information handling system 100 may further include a graphical user interface (GUI) 118. The GUI 118 in an embodiment may be a user interface that allows users to interact with the information handling system through manipulation of graphical icons and/or other visual indicators. The GUI 118 in an embodiment may allow for manipulation of these graphical icons via number of user input methods, including but not limited to input from a user keyboard command, cursor control command, gesture command, and/or voice command. In an embodiment, the GUI 118 may include a configurator operating to configure the display of sale items based on received user selections of need-based categories. In an embodiment, the GUI 118 may be a graphical web interface for display on a remotely connected information handling system (not shown). The information handling system 100 may receive user input resulting from user interaction with the GUI 118 via network 128 or bus 108. User input received from the GUI 118 may be processed by the processor 102 according to code instructions of the customer need-based recommendation management system 132 and may be stored in any of the memory devices or computer readable media of the information handling system 100, including but not limited to, the main memory 104, static memory 106, and/or computer readable medium 122. The processor may also execute instructions of the customer need-based recommendation management system 132 to direct functionality of the configurator of the GUI 118 to display one or more recommended sale items.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of code instructions 124 that can be executed to cause the computer system to perform any one or more of the methods or computer based functions disclosed herein. For example, information handling system 100 includes one or more application programs 124, and Basic Input/Output System and Firmware (BIOS/FW) code instructions 124. BIOS/FW code instructions 124 function to initialize information handling system 100 on power up, to launch an operating system, and to manage input and output interactions between the operating system and the other elements of information handling system 100. In a particular embodiment, BIOS/FW code instructions 124 reside in main memory 104, and include machine-executable code that is executed by processor 102 to perform various functions of information handling system 100. Main memory 104 may include, but may not be limited to non-volatile random access memory. In another embodiment, application programs and BIOS/FW code reside in another storage medium of information handling system 100. For example, application programs and BIOS/FW code can reside in static memory 106, drive unit 116, in a ROM (not illustrated) associated with information handling system 100 or other memory. Other options include application programs and BIOS/FW code sourced from remote locations, for example via a hypervisor or other system, that may be associated with various devices of information handling system 100 partially in main memory 104, static memory 106, drive unit 116 or in a storage system (not illustrated) associated with network interface device 120 or any combination thereof. Application programs 124, and BIOS/FW code instructions 124 can each be implemented as single programs, or as separate programs carrying out the various features as described herein. Application program interfaces (APIs) such as Win 32 API may enable application programs 124 to interact or integrate operations with one another.

In an example of the present disclosure, the processor 102 may execute code instructions 124 of the customer need-based recommendation management system 132 as disclosed herein, and an API may enable interaction between the application program and device drivers and other aspects of the information handling system and a customer need-based recommendation management system 132 thereon. The information handling system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The customer need-based recommendation management system 132 and the drive unit 116 may include a computer-readable medium 122 such as a magnetic disk in an example embodiment. The computer-readable medium of the main memory 104, static memory 106, drive unit 116, and customer need-based recommendation management system 132 may store one or more sets of code instructions 124, such as software code corresponding to the present disclosure, one or more product or service category tables generated, accessed, and maintained by the customer need-based recommendation management system 132, and/or one or more configuration lists of sale items corresponding to a preset functional description requirement, as described in greater detail below. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The customer need-based recommendation management system 132 computer readable medium 122 may also contain space for data storage. The information handling system 100 may also include a customer need-based recommendation management system 132 that may be operably connected to the bus 108. The customer need-based recommendation management system 132 may perform tasks related to heuristically and adaptively configuring the GUI 118 to accurately recommend sale items for purchase based upon determined user functional requirements. In an embodiment, the customer need-based recommendation management system 132 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

FIG. 2 is a graphical illustration of a product or service category table for a sale item as part of a configuration for an on-sale information handling system according to an embodiment of the present disclosure. In an example embodiment, FIG. 2 shows a product or service category table a type of sale item that are memory devices for use with information handling systems. An e-commerce graphical web interface in embodiments of the present disclosure may provide one or more sale items or services that may be chosen by a user, and combined with or incorporated within other sale items or services to create a single product or service for customer purchase. For example, in an example embodiment, a user may use an e-commerce GUI to choose multiple components (sale items or products) of a information handling system and one or more services in order to tailor the information handling system to that specific user's needs. As a further example, the e-commerce GUI may allow the user to choose a specific sale items within a category of sale items, including but not limited to a processor (CPU), a memory, an operating system, a software application of various types (e.g. Windows 10), and compatible peripheral devices (e.g. keyboard, speakers, mouse, printers, digital displays). As yet another example, the e-commerce GUI may allow the user to also choose a specific service within a category of services, including but not limited to a computer security service, a technical support service, or a warranty program. Although the examples described above illustrate sale items and services relating to information handling systems, sale items and services relating to any type of sale items or services are contemplated.

In order to instruct the GUI to display information that allows the user to choose a specific sale item or service within each category, the customer need-based recommendation management system in an embodiment may generate, access, and maintain one or more product or service category tables, each containing a list of all sale items available for purchase within any given category of products or services. Each product or service category table may list only sale items having the same sale item type. As an example, and as shown in FIG. 2, the customer need-based recommendation management system in an embodiment may generate, access, and maintain a memory devices product or services category table 200 containing a list of each memory device sale item available for purchase, as shown in the third column from the left, under the title "description." Each product or service category table in an embodiment may further list the sales price associated with each product or service within each category. For example, and as shown in FIG. 2, the memory devices product or service category table 200 may associate the list price, as shown in the first column from the left, under the title "list price," with each memory device sale item available for purchase, as shown in the third column from the left, under the title "description." In an embodiment, each product or service category table may be stored in a memory and/or in a computer readable medium of the information handling system.

As described above, a GUI in an embodiment may receive user input indicating that a user falls into one or more predefined need-based categories and communicate that input to the customer need-based recommendation management system, which may instruct the configurator of the GUI to display one or more recommended sale items, chosen based on the user-selected need-based category. The customer need-based recommendation management system in an embodiment may configure the GUI to display such a recommended sale item for one or more of multiple categories of products or services available for purchase. As also described above, the user-selected one or more need-based categories may align with one or more preset functional requirement definitions. Each of the functional requirement definitions may be preset prior to user interaction with the GUI and may be based on an assessment of which user characteristics are most likely to drive customer demand for a given item. For example, the preset functional requirement definitions may include, but may not be limited to, a preset list of industries in which the user may work, and/or a preset list of the regions in which the user may work. These are only two possible functional requirement definitions may be preset. Any other user descriptions likely to drive customer demand for a given item is also contemplated, including, but not limited to user demographic information, user browser history, user activity on social media, past purchase history of the user, and current user location.

As described in greater detail below, input associating a user with one or more preset functional requirement definitions may be gathered directly, via user input into the GUI, or passively, via identification of user location based on user IP address, accessing stored information regarding an identified user's past purchase history, or via user browser history or activity on social media. As shown below, as an example, the user may directly choose one or more preset functional requirement definitions via a drop-down menu on the GUI. The customer need-based recommendation management system in an embodiment may base a determination of which sale items to recommend, on these user-specific descriptions.

In order to determine which sale item to recommend based on a user's description of herself as falling within one or more preset functional requirement definitions provided via the GUI, the customer need-based recommendation management system in an embodiment may associate the one or more preset functional requirement definitions with one or more sale items within each category of products or services. In a particular embodiment, the preset functional requirement definitions may include a list of industries in which the user works. For example, and as shown in FIG. 2, the customer-need based recommendation management system in an embodiment may associate each memory device listed in the third column from the left under the title "description" with an industry in which the user may work, as shown in the fourth column from the left under the title "industry tag."

The customer-need based recommendation management system in an embodiment may associate each industry with only the memory devices that would likely be needed by a user in that industry. For example, as shown in the second row from the bottom of the memory devices product or services category table 200, the customer-need based recommendation management system in an embodiment may associate the engineering industry with a large memory device including 16 GB of memory, costing $260. This association may be based on a determination that users in the engineering industry are likely to require high-powered information handling systems with quick processing speeds and large storage capabilities. For example, operation of CAD systems or engineering simulations and design programs may require substantial computing power. In contrast, as another example, and as shown in the eighth row from the bottom of the memory devices product or service category table 200, the customer-need based recommendation management system in an embodiment may associate the education industry with a smaller memory device including 4 GB of memory, costing only $40. This association may be based on a determination that users in the education industry are not as likely to require high-powered information handling systems with large storage capabilities, and that a less expensive memory device will likely meet such a user's needs. For example, education needs may be more heavily used for web-based teaching programs or online course or tutorial streaming and the like. As needs of an industry change or capabilities of the information handling systems change, embodiments of the present disclosure may determine and detect the changing needs of users in those industries. customer-need based recommendation management system of the present disclosure is adaptable to the detected needs of users within user categories.

In another aspect of an embodiment, the preset functional requirement definitions may include a list of regions in which the user works. For example, and as shown in FIG. 2, the customer-need based recommendation management system in an embodiment may associate each memory device listed in the third column from the left under the title "description" with a region in which the user may work, as shown in the fifth column from the left under the title "region tag."

The customer-need based recommendation management system in an embodiment may associate each region with only the memory devices that would likely be needed by a user in that industry. For example, as shown in the sixth row from the bottom of the memory devices product or service category table 200, the customer-need based recommendation management system in an embodiment may associate the 16 GB memory device costing $260 with users working in the healthcare industry in the NORAM (U.S., Canada, Mexico) region. This association may be based on a determination that users working in the U.S. healthcare system need information handling systems capable of handling high-resolution diagnostic images while simultaneously networking with several backend databases storing and organizing patient information. In contrast, and as shown in the fifth row from the bottom of the memory devices product or service category table 200, the customer-need based recommendation management system in an embodiment may associate the 8 GB memory device costing $130 with users working in the healthcare industry in the APAC (Asia-Pacific region). This association may be based on a determination that users working in the Asia-Pacific region healthcare industry need not communicate with as many backend databases and/or do not routinely access a high volume of high-resolution diagnostic images, and that a less expensive memory device will likely meet such a user's needs.

As described above, the goal of these determinations of the sale item most likely to meet an individual user's needs—to enhance the customer experience by providing accurate recommendations of sale items suitable to each user's needs—hinges on the accuracy of these associations between specific sale items and preset functional requirement descriptions. For example, if the customer-need based recommendation management system recommends information handling systems that are quicker, more powerful, and thus more expensive than the customer really needs, the customer may perceive that the merchant is attempting to sell them an unnecessarily high-priced item, thereby eroding consumer trust and disrupting what could have been a positive consumer experience. On the other hand, and as another example, if the customer-need based recommendation management system recommends information handling systems that are slower, not as powerful, and cheaper than what the consumer really needs, not only does the consumer again have a negative experience, but the merchant has also missed an opportunity to sell the higher priced item that the user actually needs, resulting in a loss of opportunity for sale.

The customer-need based recommendation management system in an embodiment may solve this problem by continuously assessing and updating the accuracy of each association between a specific sale item and a specific functional requirement definition. In an embodiment, the customer-need based recommendation management system may assess the accuracy of each determination of user need by assigning an accuracy counter variable to each association between a functional requirement description and a sale item, and adjusting the accuracy counter variable based on whether the user ultimately purchases a recommended sale item. As described herein, once the customer-need based recommendation management system accesses a product or service category table and determines a particular sale item is associated with a functional requirement description, the customer-need based recommendation management system may configure the GUI to prompt the user to purchase the identified particular sale item by displaying the sale item and the sales price associated with the sale item. In response, the user may proceed to purchase the item, or may choose to view more available options, and ultimately purchase another, non-recommended item. If the user chooses the recommended item, this may be indication to the customer-need based recommendation management system that users falling within the functional requirement description of a need-based category likely need the sale item associated with the functional requirement description, and thus, that the association between the recommended sale item and the functional requirement description is relatively more accurate than previously assessed. However, if the user chooses a non-recommended item, this may be an indication to the customer-need based recommendation management system that users falling within the functional requirement description associated with the functional requirement description likely do not need the sale item associated with the functional requirement description, and thus, that the association between the recommended sale item and the functional requirement description is relatively less accurate than previously assessed.

In order to assess the accuracy of each recommendation based upon user needs, the customer-need based recommendation management system in an embodiment may assign an accuracy counter variable to each association between a sale item and one or more functional requirement definitions. For example, and as shown in FIG. 2, the customer-need based recommendation management system may assign an accuracy counter variable as listed in the far right column of the memory devices product or services category table 200 to each association between a particular sale item (listed in the third column from the left under the title "description") and one or more functional requirement definitions (listed in fourth column from the left under the title "industry tag," and/or in the fifth column from the left under the title "region tag.")

Each accuracy counter variable in an embodiment may indicate the relative accuracy of the association between a functional requirement description associated with a need-based category the user has indicated she falls within and a specific sale item. For example, as shown in the sixth row from the bottom of the memory devices product or service category table 200 in FIG. 2, the determination that users working in the healthcare industry in the NORAM (U.S., Canada, Mexico) region will likely need a information handling system with 16 GB memory capabilities may be associated with an accuracy counter variable of 20 K. As another example, as shown in the fifth row from the bottom of the memory devices product or service category table 200 in FIG. 2, the determination that users working in the healthcare industry in the APAC (Asia-Pacific) region will likely need a information handling system with 8 GB memory capabilities may be associated with an accuracy counter variable of 30 K. By comparing the accuracy counter variable listed in the fifth row from the bottom to the accuracy counter variable listed in the sixth row from the bottom, it can be seen that the choice of the 8 GB memory device more accurately meets the Asia-Pacific healthcare worker's needs than the choice of the 16 GB memory device meets the NORAM healthcare worker's needs. In a scenario in which more than one sale item is associated with the preset functional requirement definitions selected by the user, the customer need-based recommendation management system in an embodiment may choose the sale item associated with the highest accuracy counter variable in that product or service category table as an optimal sale item, and may configure the GUI to prompt the user to purchase it by displaying the sale item and its associated sales price, as shown in the first column from the left of the memory device product or service category table 200.

The customer-need based recommendation management system in an embodiment may also adjust the accuracy counter variable assigned to each association between a sale item and one or more functional requirement definitions in response to observed user purchase activities. The user's purchase of the recommended item may be indication that the association between the recommended sale item and the functional requirement description is relatively more accurate, and the user's purchase of a non-recommended item instead may be an indication that the association between the recommended sale item and the functional requirement description is less relatively accurate. In an embodiment, the customer need-based recommendation management system may receive input indicating when either of these scenarios occurs, and adjust the accuracy counter variable associated with the association between the recommended sale item and the one or more functional requirement definitions accordingly in order to provide more precise measurement of the relative accuracy of the determination that the recommended sale item may meet the needs of a user meeting those one or more functional requirement definitions.

In another aspect, the GUI may provide one or more products or services that may be chosen by a user, and combined with or incorporated within other products or services to create a single product or service for customer purchase. For example, in an example embodiment, a user may use an e-commerce GUI to choose multiple components (products) of a information handling system, such as a processor (CPU), a memory, an operating system, a software application (e.g. Windows 10), and compatible peripheral devices (e.g. keyboard, mouse, speakers, printers, digital displays). In such a scenario, before recommending a sale item, the customer need-based recommendation management system in an embodiment may need to ensure that the recommended sale item is compatible with other sale items the user has selected for purchase.

In order to ensure the recommended sale item is compatible with other sale items the user has selected for purchase, the customer need-based recommendation management system in an embodiment may include compatibility data describing the compatibility between each sale item listed in a product or service category table and one or more sale items listed in another product or service table. For example, and as shown in FIG. 2, the customer need-based recommendation management system in an embodiment may associate one or more compatibility options, as shown in the second column from the left of the memory devices product or services category table 200 under the title "compatibility options" with each memory device, as listed in the third column from the left under the title "description." Each compatibility option may describe another sale item listed within another product or service category table. For example, the compatibility options OptiPlex 3040 desktop and OptiPlex 560 desktop listed in the second column from the left in the memory devices product or services category table 200 shown in FIG. 2 may also refer to sale items listed in a desktop systems product and services category table (not shown), separate and apart from the memory devices product or services category table 200.

The customer need-based recommendation management system in an embodiment may reference the compatibility column in order to only recommend memory devices that are compatible with previous user selection of sale items listed within other product or services category tables. This may eliminate some sale items that may otherwise be considered as likely to meet the user's needs. For example, as described above, in a scenario in which more than one sale item is associated with the preset functional requirement definitions selected by the user, the customer need-based recommendation management system in an embodiment may choose the sale item associated with the highest accuracy counter variable in that product or service category table as an optimal sale item, and configure the GUI to prompt the user to purchase it.

For example, as shown in FIG. 2, the customer need-based recommendation management system in an embodiment may assign an accuracy counter variable of 20 K to the association between the 16 GB memory device and a user working in the NORAM (U.S., Canada, Mexico) healthcare industry, as shown in the sixth row from the bottom of the memory devices product or service category table 200, while assigning an accuracy counter variable of 40 K to the association between the 4 GB memory device and the same user, as shown in the bottom row. It is understood that the accuracy counter variable values may be any value and depend on data collected on sale from users that have indicated a need-based category. In such a scenario, the customer need-based recommendation management system in an embodiment may determine the 4 GB memory device is more likely to meet the user's needs. However, if the user has previously selected the Optiplex 3040 desktop computer from a desktop devices product or service category table (not shown) for purchase, the customer need-based recommendation management system in an embodiment may determine, by referencing the second column from the left of the memory devices product or service category table 200 under the title "compatibility options" that the 4 GB memory device is not compatible with the previously selected Optiplex 3040 desktop information handling system. The customer need-based recommendation management system in such an embodiment may then identify the next-highest accuracy counter variable in the memory devices product or service category table 200, located in the sixth row from the bottom having a value of 20K and being associated with the 16 GB memory device, determine the 16 GB memory is compatible with the previously selected OptiPlex 3040 Dekstop, and consequently recommend the 16 GB memory device instead of the 4 GB memory device.

Each product or service category table may also be associated with one or more preset functional requirement definitions in an embodiment. For example, as shown in the top row of the memory devices product or service category table 200 in FIG. 2, the memory devices product or service category table 200 may be associated with a plurality of preset functional requirement definitions describing the user's industry, including education, healthcare, finance, and engineering. As another example, and as also shown in the top row of the memory devices product or service category table 200 in FIG. 2, the memory devices product or service category table 200 may also be associated with a plurality of preset function requirement definitions describing the user's region, including NORAM (U.S., Canada, and Mexico) and APAC (Asia-Pacific).

FIG. 3 is a graphical illustration of a technical support product or service category table according to an embodiment of the present disclosure. As described above, a GUI in an embodiment may allow a user to also choose a specific service within a category of services, including but not limited to a computer security service, a technical support service, or a warranty program. Although the examples described above illustrate products and services relating to information handling systems, products and services relating to any type of sale items or services are contemplated.

In order to instruct the GUI to display information that allows the user to choose a specific product or service within each category, the customer need-based recommendation management system in an embodiment may generate, access, and maintain one or more product or service category tables containing a list of each sale item available for purchase within any given category of products or services. As an example, and as shown in FIG. 3, the customer need-based recommendation management system in an embodiment may generate, access, and maintain a technical support product or services category table 300 containing a list of each technical support package sale item available for purchase, as shown in the third column from the left, under the title "description." Each product or service category table in an embodiment may further list the sales price associated with each product or service within each category. For example, and as shown in FIG. 3, the technical support product or service category table 300 may associate the list price, as shown in the first column from the left, under the title "list price," with each technical support package sale item available for purchase, as shown in the third column from the left, under the title "description." In an embodiment, each product or service category table may be stored in a memory and/or in a computer readable medium of the information handling system. When the customer need-based recommendation management system in an embodiment configures the GUI to prompt the user to select a specific service for purchase, the GUI may display the selected service and its associated sales price.

In order to determine which sale item to recommend, the customer need-based recommendation management system may associate the one or more preset functional requirement definitions with one or more sale items within each category of products or services. This association is based on a user's description of herself as falling within a functional requirement description of one or more need-based categories associated with preset functional requirement definitions provided via the GUI. For example, and as shown in FIG. 3, the customer-need based recommendation management system in an embodiment may associate each technical support package sale item listed in the third column from the left under the title "description" with an industry in which the user may work, as shown in the fourth column from the left under the title "industry tag," and/or with a region in which the user may work, as shown in the fifth column from the left under the title "region tag."

The customer-need based recommendation management system in an embodiment may associate each industry with only the technical support packages that would likely be needed by a user in that industry. For example, as shown in the fifth row from the bottom of the technical support product or services category table 300, the customer-need based recommendation management system in an embodiment may associate a user working in the entertainment industry in the NORAM (U.S., Canada, Mexico) region with a ProSupport PLUS technical support package that may include the ability for a technical support staff member operating out of a control center located remotely from the user to remotely access the user's information handling system in order to fix technical issues encountered. In contrast, as shown in the bottom row of the technical support product or services category table 300, the customer need-based recommendation management system in an embodiment may associate a user working in the same industry, but in the IMEA (India, Middle-East, and Africa) region with a ProSupport technical support package that does not include the remote access option. This latter association may be made based on a determination that the remote access capability of the ProSupport PLUS package requires user access to high-speed networking infrastructure, and a determination that the networking infrastructure throughout much of the India, Middle-East, and Africa region does not operate at a high enough speed to allow the remote access capability to function properly.

The customer need-based recommendation management system in an embodiment may thus determine the technical support package sale item most likely to meet the needs of a user working in the IMEA entertainment industry is the ProSupport package. In such an embodiment, by recommending the user buy the ProSupport package at a value of $100, rather than the ProSupport PLUS package at a value of $300, the customer need-based recommendation management system may avoid recommending the user spend an extra $200 on the remote access capability that likely will not function properly in the user's region. By configuring the GUI to display for user purchase only sale items likely to meet the user's needs, the customer need-based recommendation management system may enhance user experience with the e-commerce GUI.

As described above, in order to assess the accuracy of each recommendation based upon user needs, the customer-need based recommendation management system in an embodiment may assign an accuracy counter variable to each association between a sale item and one or more functional requirement definitions. For example, and as shown in FIG. 3, the customer-need based recommendation management system may assign an accuracy counter variable as listed in the far right column of the technical support product or services category table 300 to each association between a particular sale item (listed in the third column from the left under the title "description") and one or more functional requirement definitions (listed in fourth column from the left under the title "industry tag," and/or in the fifth column from the left under the title "region tag.") As also described above, each accuracy counter variable in an embodiment may indicate the relative accuracy of the association between users fitting a certain description, as indicated by the user's choice of functional requirement definition, and a specific sale item.

In embodiments where the user may choose a plurality of preset functional requirement definitions, the customer need-based recommendation management system may assign a separate accuracy counter variable to every individual possible combination of the plurality of functional requirement definitions selected by the user. For example, as shown in FIG. 3, where the user may select an industry and a region in which he or she works, the customer need-based recommendation management system may assign a separate accuracy counter variable to every individual possible combination of these industries and regions. As a more specific example, and as shown in the fourth row from the bottom of the technical support product or service category table 300 in FIG. 3, the customer need-based recommendation management system may assign an accuracy counter variable of 30K to a determination that the ProSupport PLUS plan is the optimal technical support service for a user purchasing an OptiPlex 3040 Desktop for use in the entertainment industry in the APAC (Asia-Pacific) Region. In contrast, and as shown in the sixth row from the bottom of the technical support product or service category table 300 in FIG. 3, the customer need-based recommendation management system may assign an accuracy counter variable of only 10 K to the determination that the ProSupport PLUS plan is the optimal technical support service for a user purchasing the same information handling system for use in the same industry, but in a different region. This difference in accuracy counter variables may indicate that the ProSupport PLUS plan is less likely to be the optimal technical support service in the India, Middle-East, and Africa region than in the Asia-Pacific region.

As another example, and as shown in the second row from the bottom of the technical support product or service category table 300 in FIG. 3, the customer need-based recommendation management system may assign an accuracy counter variable of 25K to the determination that the ProSupport PLUS plan is the optimal technical support service for a user in the APAC (Asia-Pacific) region not associated with any specific industry. This difference in accuracy counter variables may indicate that the ProSupport PLUS plan is more likely to be the optimal technical support service for a user in the APAC entertainment industry than for a user in an undefined industry in the APAC region.

The GUI in an embodiment may provide one or more products or services that may be chosen by a user, and combined with or incorporated within other products or services to create a single product or service for customer purchase. For example, in an example embodiment, a user may use an e-commerce GUI to choose multiple services relating to a information handling system, such as a warranty program, a computing security system, and/or a technical support program. In such a scenario, before recommending a sale item, the customer need-based recommendation management system in an embodiment may need to ensure that the recommended sale item is compatible with other sale items the user has selected for purchase.

In order to ensure the recommended sale item is compatible with other sale items the user has selected for purchase, the customer need-based recommendation management system in an embodiment may include compatibility data for each sale item listed in a product or service category table with another sale item listed in a separate product or service category table. For example, and as shown in FIG. 3, the customer need-based recommendation management system in an embodiment may associate one or more compatibility options, as shown in the second column from the left of the technical support product or services category table 300 under the title "compatibility options" with each technical support service available for purchase, as listed in the third column from the left under the title "description."

Each compatibility option may describe another sale item listed within another product or service category table. For example, the compatibility options OptiPlex 3040 desktop and OptiPlex 560 desktop listed in the second column from the left in the technical support product or services category table 300 shown in FIG. 3 may also refer to sale items listed in a desktop systems product and services category table (not shown), separate and apart from the technical support product or services category table 300. As a further example, as shown in the fifth row from the bottom of the technical support product or service category table 300, as shown in FIG. 3, the customer need-based recommendation management system in an embodiment may associate the Optiplex 3040 Desktop information handling system with the ProSupport PLUS technical support package that includes remote access capabilities. As yet another example, as shown in the bottom row of the technical support product or service category table 300, the customer need-based recommendation management system in an embodiment may associate the ProSupport technical support package that does not include remote access capabilities with the older model Optiplex 560 Desktop. In such an embodiment, the customer need-based recommendation management system may only recommend the technical support package having remote access capabilities for newer model information handling systems having greater processing power, better graphics, and/or better interfaces for high-speed networks, due to the networking, graphical, and processing capabilities required for the remote access capabilities to function properly.

Each product or service category table may also be associated with one or more preset functional requirement definitions in an embodiment. For example, as shown in the top row of the technical support product or service category table 300 in FIG. 3, the technical support product or service category table 300 may be associated with a plurality of preset function requirement definitions describing the user's region, including NORAM (U.S., Canada, and Mexico), APAC (Asia-Pacific), and IMEA (India, Middle-East, and Africa). As another example, and as also shown in the top row of the technical support product or service category table 300 in FIG. 3, the technical support product or service category table 300 may also be associated with a plurality of preset functional requirement definitions describing the user's industry, including education, entertainment, and finance. In contrast, as described above, the memory device product or service category table may be associated with each of these industries, in addition to the engineering industry. The lack of association between the technical support product or service category table 300 and the engineering industry in an embodiment may, for example, reflect a lack of demand for technical support in information handling systems sold to engineers who may be capable of performing their own technical support.

The example product or service category tables shown in FIGS. 2 and 3 are but a couple of examples of a plurality of product or service category tables for a multitude of sale items and support or services offered in connection with the purchase of an information handling system via a configurator. As can be seen, the plurality of product or service category tables for several sale items and services provide for a focused, customer-need based experience for an entire configuration list of sale items and services associated with the information handling system being purchased. It is contemplated that product or service category tables may be established for each sale item or service. These product or service category tables may include inter-compatibility data for sale items or services that may be selected outside of sale items with high accuracy counter variable values suggested to a user. Thus, should an alternative sale item or service be selected at any juncture in configuring the information handling system, compatibility may be maintained.

Figure 4:
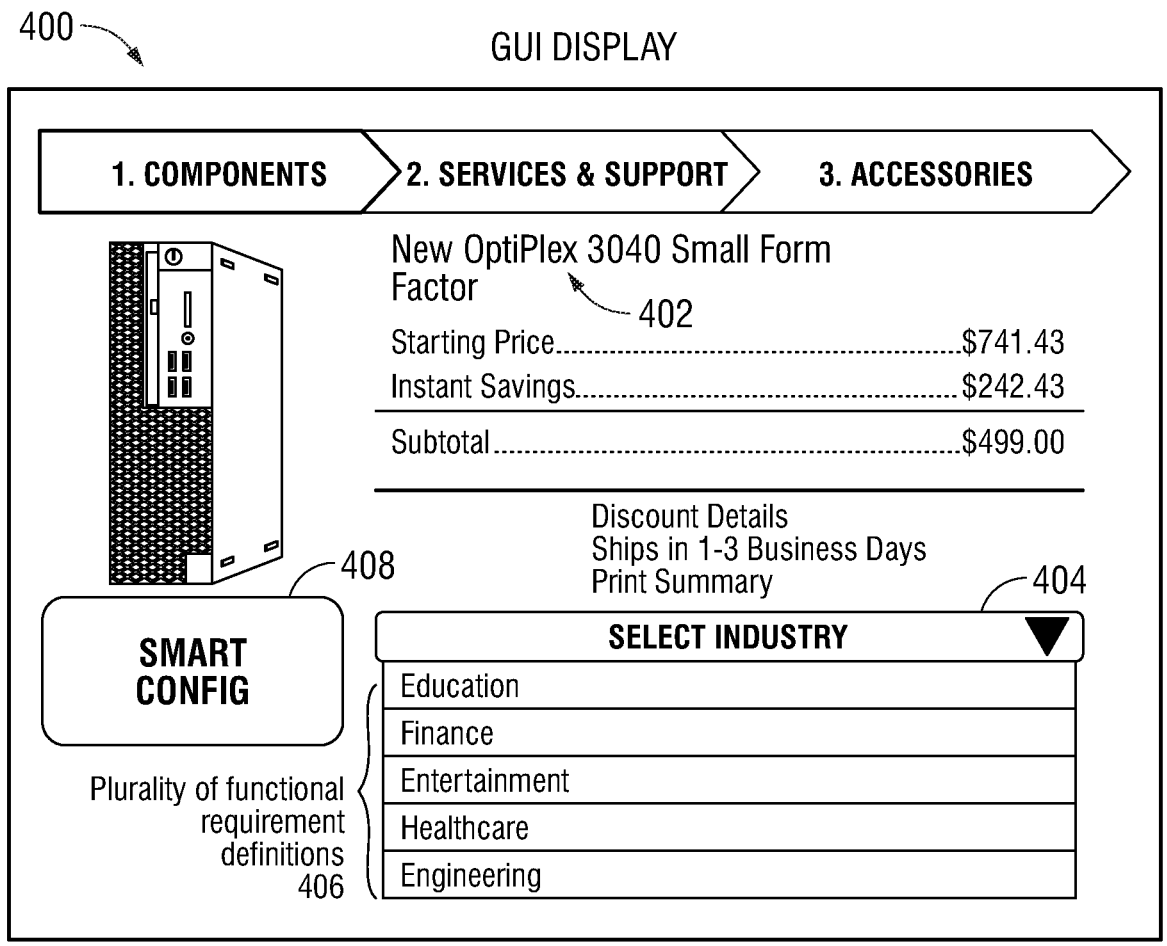
FIG. 4 is a graphical illustration of a graphical web interface display according to an embodiment of the present disclosure.

FIG. 4 is a graphical illustration of a GUI display including a pull-down menu of user industries according to an embodiment of the present disclosure. As described above, an e-commerce graphical user interface in embodiments of the present disclosure may provide one or more products or services that may be chosen by a user, and combined with or incorporated within other products or services to create a single product or service for customer purchase. For example, in an example embodiment, a user may use an e-commerce GUI to choose multiple components (sale items or products) of an information handling system for purchase and one or more services in order to tailor the information handling system to that specific user's needs. As a more specific example, as shown in FIG. 4, a user may use the GUI display 400 to choose multiple components, products, or services for a chosen information handling system model, such as a new OptiPlex 3040 small form factor 402. Although the example described above illustrate products and services relating to information handling systems, products and services relating to any type of sale items or services configured into a broader product are contemplated.

As also described above, a GUI in an embodiment may receive one or more user inputs indicating a user falls within a predetermined functional requirement description of a need-based category and communicate those user inputs to the customer need-based recommendation management system. The customer need-based recommendation management system may determine which sale items are most likely to meet the needs of a user falling within the functional requirement description of the chosen need-based category. As also described above, the received one or more user descriptions may align with one or more preset functional requirement definitions. Each of the functional requirement definitions may be preset prior to user interaction with the GUI and may be associated with a need-based category determined to drive customer demand for a type of sale item or a specific sale item that is a part of a product such as an information handling system for purchase. For example, the need-based category in an embodiment may be user industry, and the functional requirement description may be one industry chosen from a list of industries within that need-based category. As another example, the need-based category in an embodiment may be user region, and the functional requirement description may be one region chosen from a list of regions within that need-based category. Users' regions and industries are only two possible need-based categories that may be preset. Any other user need-based categories likely to assist in the determination of the best product or service for a given customer is also contemplated, including, but not limited to user demographic information, user browser history, user activity on social media, past purchase history of the user, current user location.

Input associating a user with one or more preset functional requirement definitions may be gathered directly, via user input into the GUI, or passively, via identification of user location based on user IP address, accessing stored information regarding an identified user's past purchase history, or via user browser history or activity on social media. For example, as shown in FIG. 4, the user may directly choose one or more preset functional requirement definitions 406 via an industry select drop-down menu 404 on the GUI display 400. If the user chooses to execute the "smart configuration" functionality of the GUI by selecting the "smart config" button 408 on the GUI display 400, the customer need-based recommendation management system in an embodiment may base a determination of which sale items to recommend on which of the plurality of function requirement definitions 406 the user chooses from within the industry select drop-down menu 404.

Figure 5:
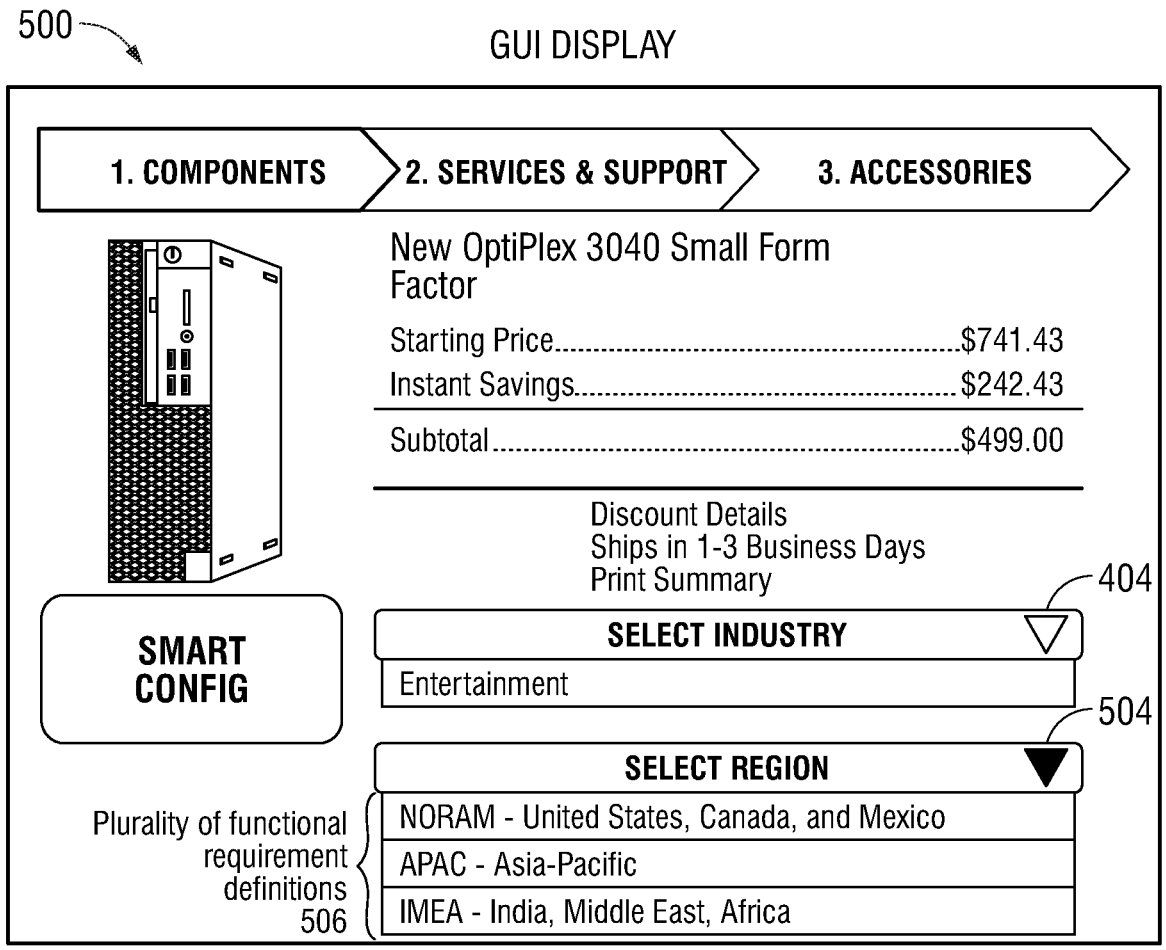
FIG. 5 is a graphical illustration of a graphical web interface display according to an embodiment of the present disclosure.

FIG. 5 is a graphical illustration of a GUI display including a pull-down menu of user industries and a pull-down menu of user regions according to an embodiment of the present disclosure. As described above, a GUI in an embodiment may receive user input indicating the user falls within more than one functional requirement description, each aligning with a preset functional requirement definition. For example, one preset functional requirement definition may include, but may not be limited to the industry in which the user may work, and a second functional requirement definition may include, but may not be limited to the region in which the user works.

Input associating a user with more than one preset functional requirement definition may be gathered directly, via user input into the GUI, and/or passively, via identification of user location based on user IP address, accessing stored information regarding an identified user's past purchase history, or via user browser history or activity on social media. For example, as shown in FIG. 5, the user may select "entertainment" as her industry, as shown in the select industry pull-down menu 404, and may also directly choose one or more preset functional requirement definitions 506 via a region select drop-down menu 504 on the GUI display 500. In such an embodiment, the customer need-based recommendation management system may base a determination of which sale items to recommend on the combination of which of the plurality of function requirement definitions 506 the user chooses from within the region select drop-down menu 504, and the selected "entertainment" function requirement definition the user chose from within the industry select drop-down menu 404.

Figure 6:
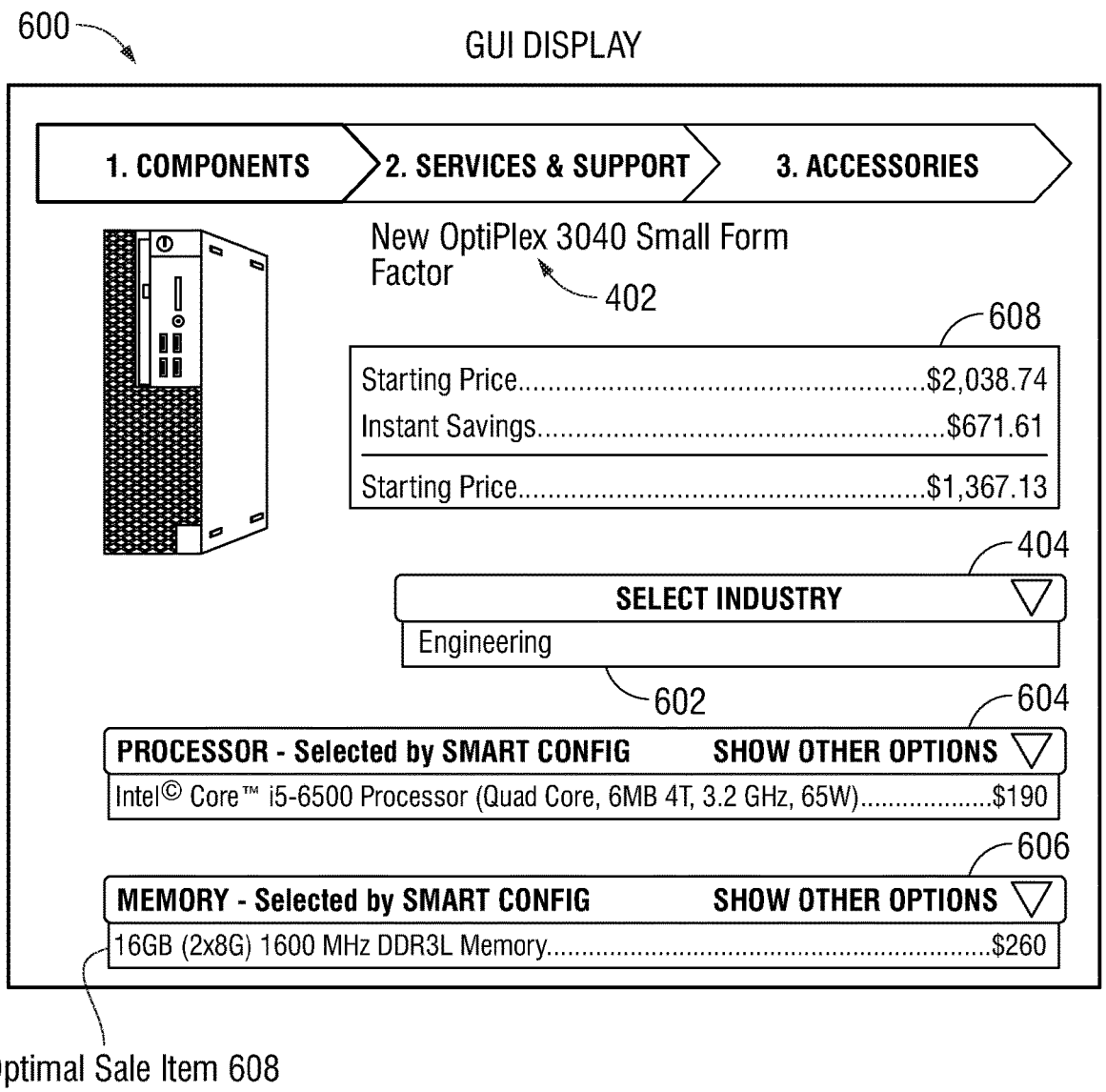
FIG. 6 is a graphical illustration of a graphical web interface display according to an embodiment of the present disclosure.

FIG. 6 is a graphical illustration of a GUI display showing a smart configuration list of recommended sale items according to an embodiment of the present disclosure. As described above, an e-commerce graphical user interface in embodiments of the present disclosure may provide one or more products or services that may be chosen by a user, and combined with or incorporated within other products or services to create a single product or service for customer purchase. As also described above, if a user selects one or more functional description requirements, and selects the smart configuration button, the customer need-based recommendation management system in an embodiment may configure the GUI to display only sale items within each product or service category associated with the one or more user-selected functional description requirements in a "smart configuration." For example, as shown in FIG. 6, if a user selects the functional description requirement 602 from the industry pull-down menu 404 identifying her industry as engineering, then selects the smart configuration button, the customer need-based recommendation management system may configure the GUI to display only processors (CPUs) and memory devices associated with the engineering functional description requirement. As a more specific example, as shown in FIG. 6, the customer need-based recommendation management system in an embodiment may configure the GUI to display within a memory device drop down menu 606 the 16 GB 1600 MHz DDR3L optimal sale item 608 associated with the engineering industry functional requirement description in the memory device product or service category table, as well as the sales price associated with the 16 GB optimal sale item 608 in the memory device product or service table.

Each of the products or services to be combined in an embodiment to create a single product or service configured especially for customers falling within a selected preset functional description may be presented within a configuration list. For example, as shown in FIG. 6, the Intel® Core™ i5-6500 Processor component and 16 GB 1600 MHz DDR3L Memory component, as well as other components or services (not shown) may be combined within a configuration list that includes all components or services that combine to create an OptiPlex 3040 desktop customized for use in the engineering industry. The full configuration list for a product configured especially for customers falling within a selected preset functional description may include a plurality of sale items, each from a different product or services category table, and each associated with the selected preset functional description. For example, as shown in FIG. 6, the full configuration list for an OptiPlex 3040 desktop especially configured for use in the engineering industry may include the Intel® Core™ i5-6500 Processor sale item found in a processor product and services category table, the 16 GB 1600 MHz DDR3L optimal sale item 608 found in the memory device product and services category table, and several other sale items, each of which are found in separate product and services category tables and are associated with the preset functional description requirement identifying the user's industry as engineering. A configuration list corresponding to each preset functional description requirement and/or each combination of a plurality of preset functional description requirements may be stored in memory.

As also shown in FIG. 6, the customer need-based recommendation management system may also configure the GUI to display one or more recommended processors within a processor drop-down menu 604. If the user has previously selected for purchase another sale item, upon the user selecting the smart configuration button, the customer need-based recommendation management system may configure the GUI to only display related sale items from other product or service categories that are identified as being compatible with the previously user-selected sale item. For example, and as shown in FIG. 6, if the user has already selected for purchase the OptiPlex 3040 Desktop 402, the customer need-based recommendation management system may configure the GUI to only display memory devices that are identified in the memory devices product or service category table described above as being compatible with the Optiplex 3040 Desktop 402, such as, the 16 Gb MH DDR3L optimal sale item 608.

Upon selecting an optimal sale item from each product or service category table associated with the user-selected functional description requirement, the customer need-based recommendation management system in an embodiment may configure the GUI to display each of the optimal sale items, the sales prices associated with each of these optimal sale items within their respective product or service category tables, and a starting price combining each of these sales prices into a total amount. In such an embodiment, the displayed starting price may represent the starting price for a product incorporating only sale items recommended based on the user's selection of one or more functional description requirements. For example, the customer need-based recommendation management system may configure the GUI to display each of the optimal sale items associated with the engineering industry functional description requirement in each product or service category table associated with the engineering industry functional description requirement, display the sales prices associated with each of the optimal sale items within each of their respective product or service category tables, and a starting price 608 of $2,038.74 combining each of those sales prices into a total amount. In such an embodiment, the displayed starting price 608 of $2,038.74 may represent the starting price for an OptiPlex 3040 Desktop 402 optimized for a user in the engineering industry.

By comparing the starting price of $741.43 of the non-optimized OptiPlex 3040 desktop with the starting price of $2,038.74 of the same desktop optimized for the engineering industry, it becomes evident the OptiPlex 3040 desktop an engineer will need costs $1,297.31 more than a non-optimized OptiPlex 3040 desktop. In an embodiment, the customer need-based recommendation management system may configure the GUI to display each of the optimal sale items, and their individual and combined prices upon receipt of a single user instruction—user selection of the "smart config" button. If the user chooses to purchase the optimal sale items, the customer need-based recommendation management system in an embodiment will have effectively customized a product for a specific user and captures a $1,297.31 increase in price in just one click.

Figure 7:
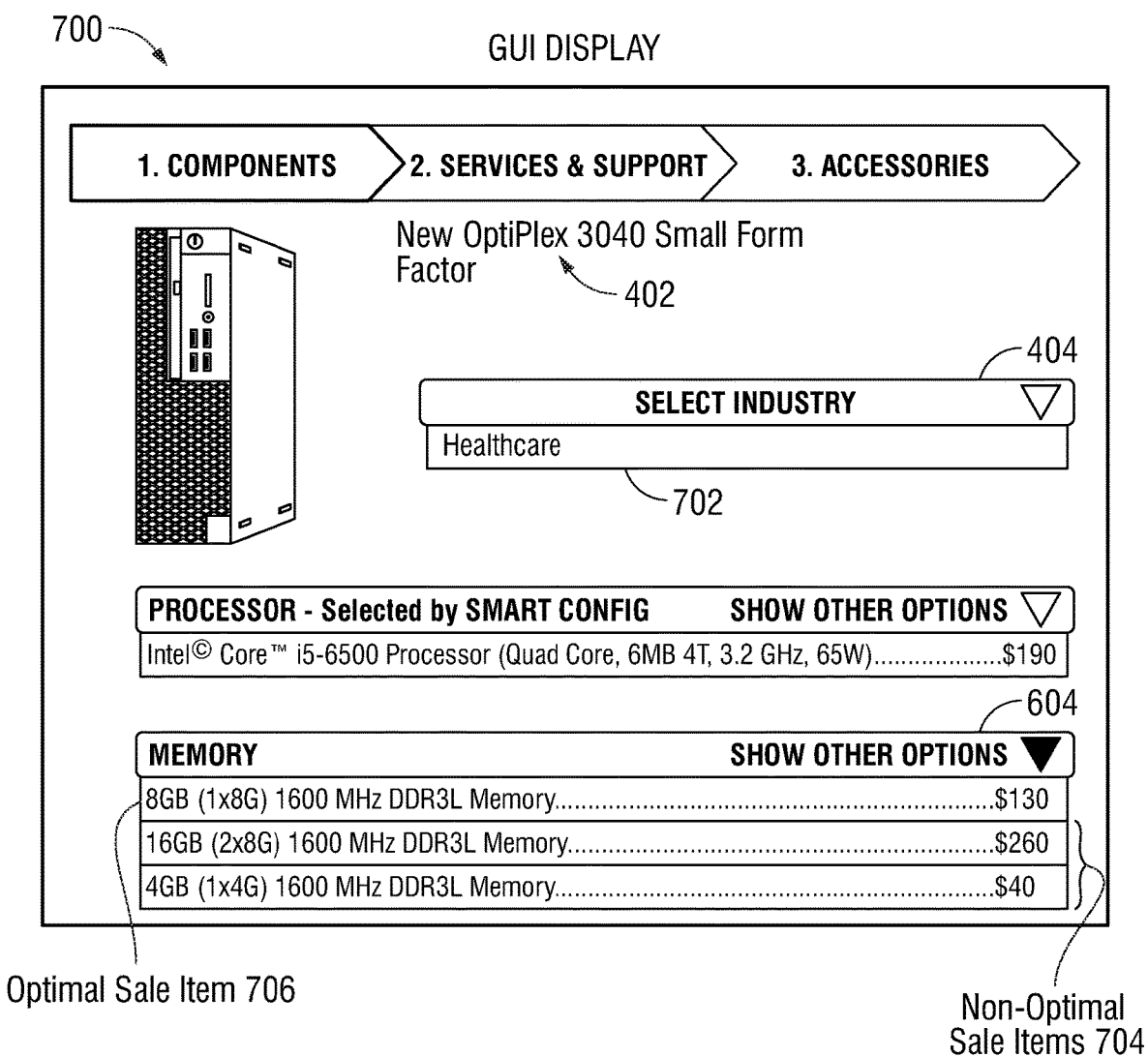
FIG. 7 is a graphical illustration of a graphical web interface display according to an embodiment of the present disclosure.

FIG. 7 is a graphical illustration of a GUI display including a pull-down menu of optimal and non-optimal sale items associated with a user's industry according to an embodiment of the present disclosure. As described above, once the customer need-based recommendation management system accesses a product or service category table and determines a particular sale item is associated with a user-selected functional description requirement, the customer-need based recommendation management system may instruct the GUI to prompt the user to purchase the identified particular sale item. For example, as shown in FIG. 7, once the customer need-based recommendation management system accesses the memory device product or service category table described above and determines the 8 GB memory device is associated with the "healthcare" preset functional requirement definition 702 the user has chosen from the industry select pull-down menu 404 to describe her industry, the customer need-based recommendation management system may instruct the GUI to display on GUI display 700 the 8 GB memory device optimal sale item 706 for purchase.

In response, the user may proceed to purchase the item, or may choose to view more available options by using the "show other options" pull-down functionality of the memory device pull-down menu 604. Selecting the "show other options" pull-down functionality of the memory device pull-down menu 604 may prompt the GUI to display a plurality of additional, non-optimal sale items 704 also listed in the same product or service category table as the optimal sale item. The user may then choose whether to purchase the optimal sale item 706, or one of the plurality of non-optimal sale items 704. Purchase of the optimal sale item 706 may be and indication that the determination by the customer need-based recommendation management system of the 8 GB memory device as the optimal sale item 706 for a user that has chosen the "healthcare" preset functional requirement definition 702 from the industry select pull-down menu 404 to describe her industry may be relatively more accurate than previously assessed. In contrast, purchase of one of the non-optimal sale items 704 may be an indication that the determination by the customer-need based recommendation management system of the 8 GB memory device as the optimal sale item 706 for a user that has chosen the "healthcare" preset functional requirement definition 702 from the industry select pull-down menu 404 to describe her industry may be relatively less accurate than previously assessed.

Figure 8:
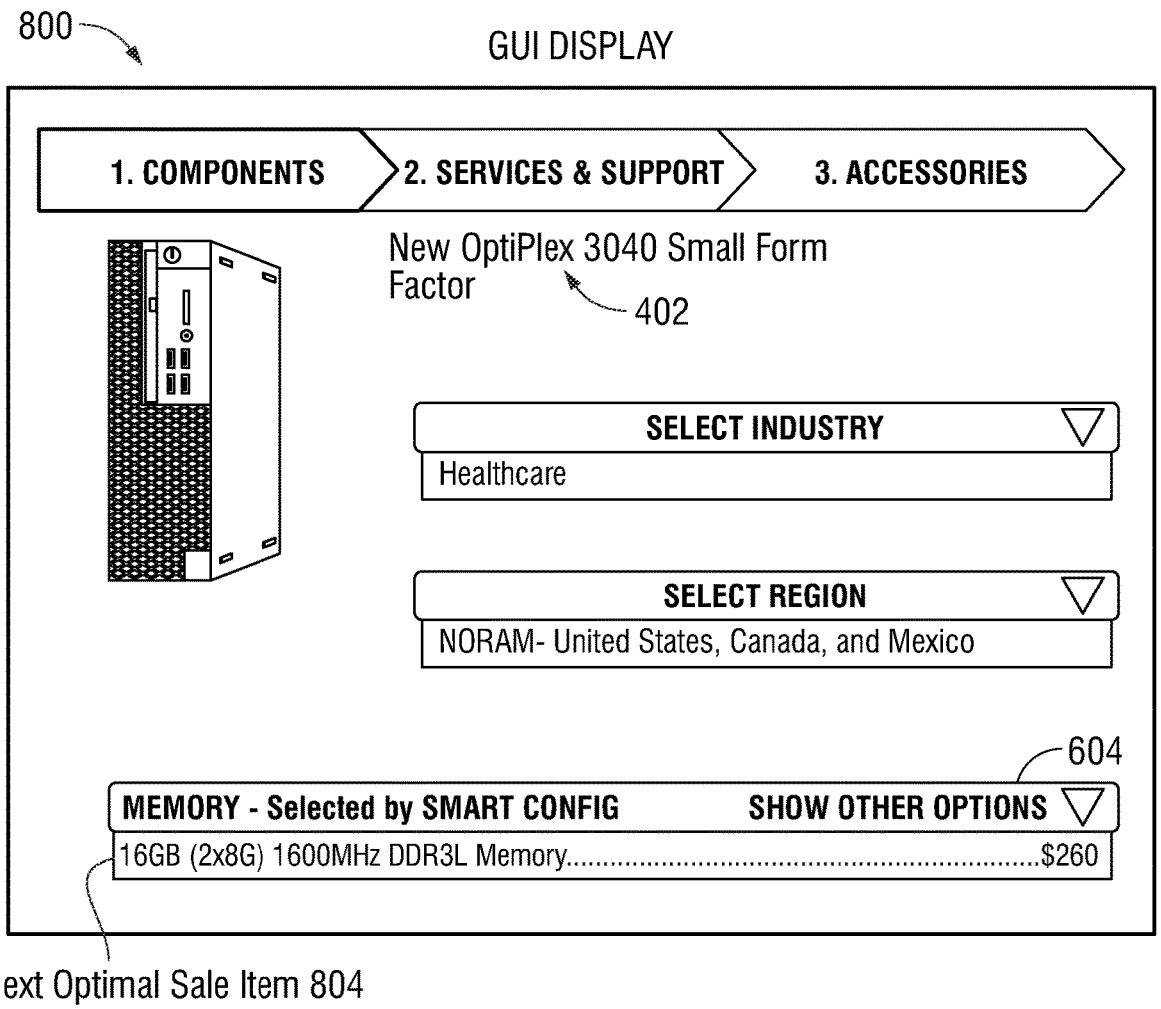
FIG. 8 is a graphical illustration of a graphical web interface display according to an embodiment of the present disclosure.

FIG. 8 is a graphical illustration of a GUI display including a next optimal sale item associated with a user's region and industry according to an embodiment of the present disclosure. As described above, the GUI in an embodiment may provide one or more products or services that may be associated with a user-selected functional description requirement, and combined with or incorporated within other products or services to create a single product or service optimized for a specific user's needs for customer purchase. For example, and as shown in FIG. 8, in an example embodiment, a user may use the GUI to identify multiple sale items (components or services) for incorporation into or combination with a new OptiPlex 3040 Small Form Factor information handling system 402 customized for use in the NORAM healthcare industry, such as a memory device associated with the functional description requirements identifying the user's region as NORAM and identifying the user's industry as healthcare.

As also described above, the one or more sale items identified by the customer need-based recommendation management system as being associated with the user-selected functional description requirements may be listed within a configuration list associated with the user-selected one or more functional requirement descriptions and the GUI may display the full configuration list for purchase by the user. When generating the configuration list that combines optimal sale items from a plurality of product or service category tables, the customer need-based recommendation management system in an embodiment may first ensure that each optimal sale item identified in each product or service category table is compatible with other optimal sale items from other product or services configuration tables in the configuration list. For example, and as shown in FIG. 8, before recommending a particular memory device for customer purchase, the customer need-based recommendation management system in an embodiment may need to ensure that the recommended memory device sale item is compatible with the chosen new OptiPlex 3040 Small Form Factor 402 information handling system, and/or with other sale items the user has selected for purchase (e.g. processor, peripheral devices, operating systems, software packages, etc.).

As also described above, in order to ensure the recommended sale item is compatible with other sale items the user has selected for purchase, the customer need-based recommendation management system in an embodiment may need to eliminate from consideration some sale items that may otherwise be considered as likely to meet the user's needs. For example, as described above, in a scenario in which more than one sale item in a particular product or service category table is associated with the preset functional requirement definitions selected by the user, the customer need-based recommendation management system in an embodiment may choose the sale item associated with the highest accuracy counter variable in that product or service category table as an optimal sale item, and prompt the user to purchase it. However, if the identified optimal sale item is not deemed compatible with other sale items the user has selected for purchase from other product or service category tables, the customer need-based recommendation management system in an embodiment may choose the sale item associated with the next highest accuracy counter variable in that product or service category table as the next optimal sale item, determine the next optimal sale item is compatible with the other sale items the user has selected for purchase from other product or services category tables, and prompt the user to purchase the next optimal sale item, rather than the identified optimal sale item.

As a more specific example, the customer need-based recommendation management system in an embodiment may choose the 4 GB memory device associated with the highest accuracy counter variable in the memory device product or service category table as an optimal sale item. However, as shown in FIG. 8, if the customer has also selected the new OptiPlex 3040 small form factor 402 information handling system for purchase, the customer need-based recommendation management system in an embodiment may choose the 16 GB memory device associated with the next highest accuracy counter variable in the memory device product or service category table and identified as compatible with the OptiPlex 3040 desktop 402 as the next optimal sale item 804, and prompt the user to purchase the next optimal sale item 804, rather than the identified 4 GB optimal sale item.

Figure 9:
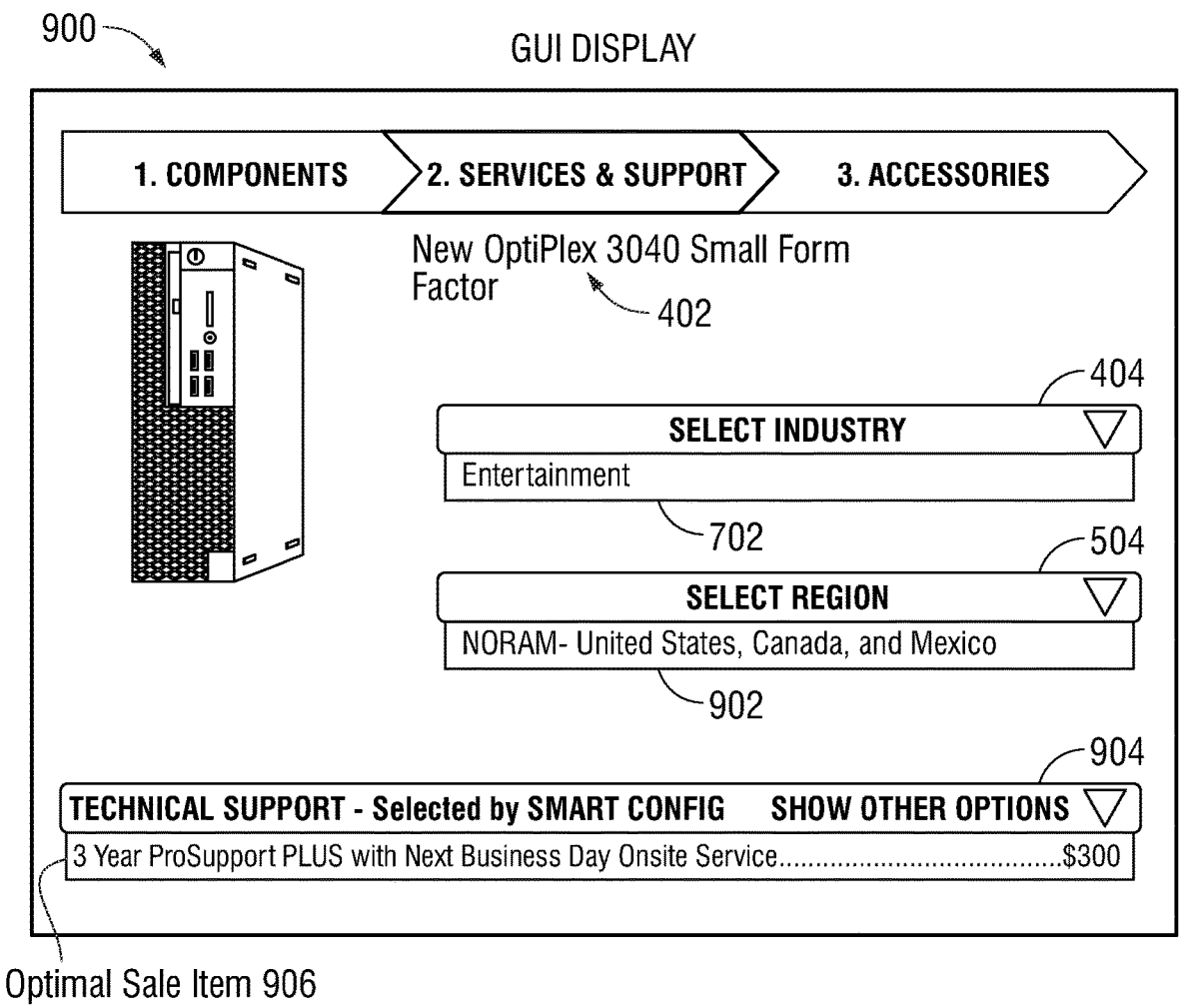
FIG. 9 is a graphical illustration of a graphical web interface display according to an embodiment of the present disclosure.

FIG. 9 is a graphical illustration of a GUI display including an optimal technical support sale item associated with a user's region and industry according to an embodiment of the present disclosure. As described above, a GUI in an embodiment may receive more than one user-selected functional requirement definition and each functional requirement definition may be from a different need-based category. For example, a user may select a functional requirement description from the user industry need-based category and a functional requirement description from the user region need-based category. As a more specific example, and as shown in FIG. 9, the user may select the "entertainment" preset functional requirement definition 702 as her industry, as shown in the select industry pull-down menu 404, and may also select the "NORAM" (including the United States, Canada, and Mexico) preset function requirement definition 902 as her region, as shown in the select region pull-down menu 504 on the GUI display 900. As also described above, the customer need-based recommendation management system may base a determination of a which sale items to recommend on the combination of the user's selection of the "entertainment" preset functional requirement definition 702 and the "NORAM" (including the United States, Canada, and Mexico) preset function requirement definition 902.

As described above, in embodiments where the user may choose a plurality of preset functional requirement definitions, the customer need-based recommendation management system may assign a separate accuracy counter variable to every individual possible combination of the plurality of functional requirement definitions selected by the user. As such, the optimal sale item chosen by the customer need-based recommendation management system may differ between customers who have chosen several preset functional requirement definitions in common, but have also chosen just one preset functional requirement definition differently from one another.

As shown in GUI display 900 in FIG. 9, a user who wishes to purchase a new OptiPlex 3040 Small Form Factor information handling system 402, has selected the "entertainment" preset functional requirement definition 702 as her industry, and also selected the "NORAM" (including the United States, Canada, and Mexico) preset function requirement definition 902 as her region, may be prompted by the customer need-based recommendation management system to purchase the 3 year ProSupport PLUS optimal sale item 906, within the technical support pull-down menu 904. However, in another embodiment, a user who wishes to purchase the same information handling system 402, has selected the same "entertainment" preset functional requirement definition 702 as her industry, but has selected a preset function requirement definition other than "NORAM" as her region may be prompted by the customer need-based recommendation management system to purchase an optimal sale item other than the 3 Year ProSupport PLUS technical support program.

Figure 10:
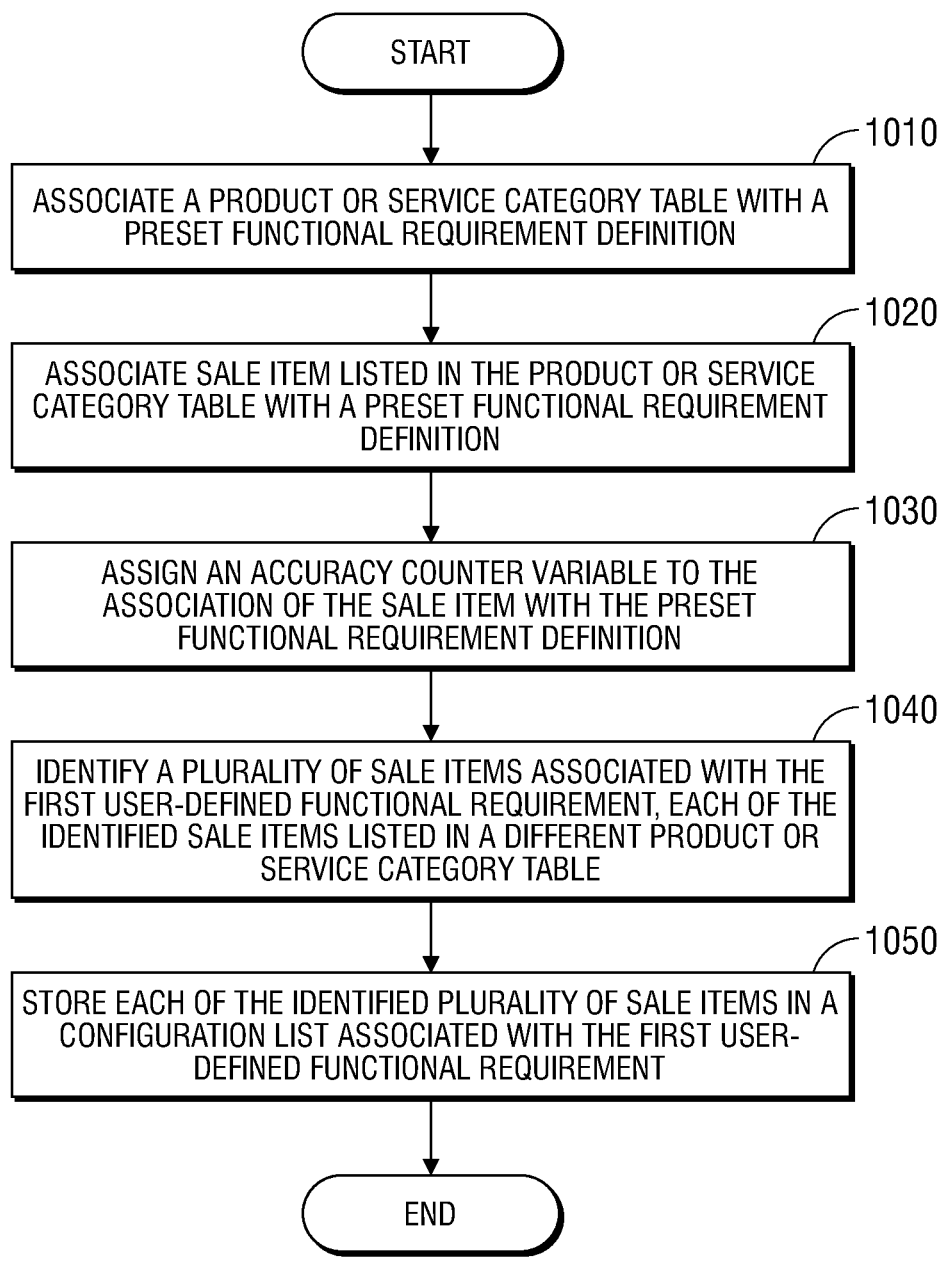
FIG. 10 is a flow chart illustrating a method of generating a product or service category table according to an embodiment of the present disclosure.

FIG. 10 is a flow chart illustrating a method of generating a product or service category table and assigning an accuracy counter variable to an association of a sale item with a preset functional requirement definition according to an embodiment of the present disclosure. As described above, an e-commerce graphical user interface in embodiments of the present disclosure may provide one or more sale items or services that may be chosen by a user, and combined with or incorporated within other sale items or services to create a single, final product or service package for customer purchase. For example, in an embodiment, a user may use an e-commerce GUI to choose multiple components of a information handling system, each component falling into a category or sale item type (e.g. processors, memory devices, operating systems, software applications, and compatible peripheral devices) and one or more services, each service falling into a category or sale item type (e.g. computer security services, technical support services, or warranty programs) in order to tailor the information handling system to that specific user's needs. In order to instruct the GUI to display information that allows the user to choose a specific product or service within each category, the customer need-based recommendation management system in an embodiment may generate, access, and maintain one or more product or service category tables containing a list of each sale item available for purchase within any given category of sale items or services or of a given sale item type.

As shown in FIG. 10, at block 1010, in an embodiment a product or service category table may be associated with a preset functional requirement definition. For example, as described above, the memory devices product or service category table may be associated with a plurality of preset functional requirement definitions describing the user's industry, including education, healthcare, finance, and engineering, and may also be associated with a plurality of preset function requirement definitions describing the user's region, including NORAM (U.S., Canada, and Mexico) and APAC (Asia-Pacific).

Associating a product or service category table with a preset functional requirement definition may allow the customer need-based recommendation management system to only prompt the user to purchase sale items falling into product or service categories the user will likely need. For example, the technical support product or service category table may be associated with a plurality of preset function requirement definitions describing the user's region, including NORAM (U.S., Canada, and Mexico), APAC (Asia-Pacific), and IMEA (India, Middle-East, and Africa), and may also be associated with a plurality of preset functional requirement definitions describing the user's industry, including education entertainment and finance. As also described above, the lack of association between the technical support product or service category table and the engineering industry need-based category may, for example, reflect a lack of demand for technical support in information handling systems sold to engineers who may be capable of performing or have their own technical support.

At block 1020, in an embodiment, a sale item listed in a product or service category table may be associated with a preset functional requirement definition. As described above, a GUI in an embodiment may receive one or more user-selected functional requirement definitions and communicate those user inputs to the customer need-based recommendation management system, which may determine which sale items will most likely meet that user's needs. The customer need-based recommendation management system in an embodiment may configure the GUI to display one or more recommended sale items most likely to meet that user's needs for one or more of multiple categories of products or services available for purchase via the GUI. Each of the user-selected functional requirement definitions may be preset prior to user interaction with the GUI and each may correlate to a need-based category predetermined to drive customer demand for a given sale item. For example, the need-based categories may include, but may not be limited to, a user industry and/or a user region or geographic location. These are only two possible need-based categories that may be predetermined. Any other need-based category determined to drive customer demand for a given sale item is also contemplated, including, but not limited to user demographic information, user browser history, user activity on social media, past purchase history of the user, current user location.

As also described above, in order to determine which sale item to recommend based on a user's selection of one or more preset functional requirement definitions provided via the GUI, the customer need-based recommendation management system in an embodiment may associate the one or more preset functional requirement definitions with one or more sale items within each category of products or services. In a particular embodiment, the preset functional requirement definition may identify the industry in which the user works. In such an embodiment, the customer-need based recommendation management system in an embodiment may associate each industry with only the sale items or services that would likely be needed by a user in that industry.

For example, the customer-need based recommendation management system in an embodiment may associate the engineering industry with a large memory device including 16 GB of memory, costing $260. This association may be based on a determination that users in the engineering industry are likely to require high-powered information handling systems with quick processing speeds and large storage capabilities. In contrast, as another example, the customer-need based recommendation management system in an embodiment may associate the education industry with a smaller memory device including 4 GB of memory, costing only $40. This association may be based on a determination that users in the education industry are not as likely to require high-powered information handling systems with large storage capabilities, and that a less expensive memory device will likely meet such a user's needs. Each need-based category may be further granulated in some embodiments to sub-categories that may serve as an additional level of functional requirement definitions. For example, a healthcare need-based category may be broken into an administrative subcategory, a diagnostics subcategory, or other subcategories. It is understood that any level of need-based category or subcategory may be used with the present embodiments.

In another aspect of an embodiment, the preset functional requirement definitions may identify the region in which the user works. For example, as described above, the customer-need based recommendation management system in an embodiment may associate each region with only the memory devices that would likely be needed by a user in that industry. For example, as described above, the customer-need based recommendation management system in an embodiment may associate the 16 GB memory device costing $260 with users working in the healthcare industry in the NORAM (U.S., Canada, Mexico) region. This association may be based on a determination that users working in the U.S. healthcare system need information handling systems capable of handling high-resolution diagnostic images while simultaneously networking with several back-end databases storing and organizing patient information. In contrast, and as also described above, the customer-need based recommendation management system in an embodiment may associate the 8 GB memory device costing $130 with users working in the healthcare industry in the Asia-Pacific region. This association may be based on a determination that users working in the Asia-Pacific region healthcare industry need not communicate with as many backend databases and/or do not routinely access a high volume of high-resolution diagnostic images, and that a less expensive memory device will likely meet such a user's needs. Thus, several different ways of subcategorizing a need-based category, such as health care, are contemplated in various embodiments. In another aspect, the region need-based categories may be subdivided by industry or industry subcategories in other example embodiments to provide additional functional requirement definitions for the benefit of customizing sale item and services presented to a customer.

In another example described above, the customer-need based recommendation management system in an embodiment may associate a user working in the entertainment industry in the NORAM (U.S., Canada, Mexico) region with a ProSupport PLUS technical support package that may include the ability for a technical support staff member operating out of a control center located remotely from the user to remotely access the user's information handling system in order to fix technical issues encountered. In contrast, and in another example described above, the customer need-based recommendation management system in an embodiment may associate a user working in the same industry, but in the IMEA (India, Middle-East, and Africa) region with a ProSupport technical support package that does not include the remote access option. This latter association may be made based on a determination that the remote access capability of the ProSupport PLUS package requires user access to high-speed networking infrastructure, and a determination that the networking infrastructure throughout much of the IMEA (India, Middle-East, and Africa) region may not operate at a high enough speed to allow aspects of the remote access capability to function properly. The customer need-based recommendation management system in an embodiment may thus determine the technical support package sale item most likely to meet the needs of a user working in the IMEA entertainment industry is the ProSupport package. In such an embodiment, by recommending the user buy the ProSupport package at a value of $100, rather than the ProSupport PLUS package at a value of $300, the customer need-based recommendation management system may avoid recommending the user spend an extra $200 on the remote access capability that may not function properly in the user's region.

At block 1030, in an embodiment, an accuracy counter variable may be assigned to an association between a sale item and a preset functional requirement definition. To achieve the goal of recommending sale items likely to meet a specific user's needs, customer-need based recommendation management system maintains these associations between specific sale items and user-selected functional description requirements. For example, if the customer-need based recommendation management system recommends information handling systems that are quicker, more powerful, and thus more expensive than the customer really needs, the customer may perceive that the merchant is attempting to sell them an unnecessarily high-priced item, thereby eroding consumer trust and disrupting what could have been a positive consumer experience. On the other hand, and as another example, if the customer-need based recommendation management system recommends information handling systems that are slower, not as powerful, and cheaper than what the consumer really needs, not only does the consumer again have a negative experience, but the merchant has also missed an opportunity to sell the higher priced item that the user actually needs, resulting in a loss of opportunity for sale.

In order to assess the accuracy of each recommendation based upon user-selected functional requirement descriptions, at block 1030 in an embodiment, the customer-need based recommendation management system may assign an accuracy counter variable to each association between a sale item and one or more functional requirement definitions. For example, as described above, the determination that users working in the healthcare industry in the NORAM (U.S., Canada, Mexico) region will likely need a information handling system with 16 GB memory capabilities may be associated with an accuracy counter variable of 20 K. As another example, and as also described above, the determination that users working in the healthcare industry in the Asia-Pacific region will likely need a information handling system with 8 GB memory capabilities may be associated with an accuracy counter variable of 30 K. By comparing these accuracy counter variables, it can be seen that the choice of the 8 GB memory device worker more accurately meets the Asia-Pacific healthcare worker's needs than the choice of the 16 GB memory device meets the North American healthcare worker's needs. As described below, in a scenario in which more than one sale item within a single product or services category table is associated with the preset functional requirement definitions selected by the user, the customer need-based recommendation management system in an embodiment may choose the sale item associated with the highest accuracy counter variable in that product or service category table as an optimal sale item, and prompt the user to purchase it.

At block 1040, in an embodiment, the customer need-based recommendation management system may identify a plurality of sale items associated with the first user-defined functional requirement, each of the identified sale items listed in a different product or service category table. As described above, the customer need-based recommendation management system may configure the GUI in embodiments of the present disclosure to provide more than one sale items or services that may be chosen by a user, and combined with or incorporated within other sale items or services to create an overall, single product or service for customer purchase. Each sale item or service sale item (e.g. processor, memory, peripheral devices, etc.) displayed by the GUI for incorporation within a total product or device (e.g. an information handling system) may be listed in a separate product or service category table. In order to display only the sale items in each of these categories associated with a user-selected functional requirement description, as described in greater detail below, the customer need-based recommendation management system in such an embodiment may identify a plurality of sale items, each being listed in a separate product or services category table, and each sale item being associated with the same preset functional requirement definition or combination of preset functional requirement definitions.

At block 1050, in an embodiment, the customer need-based recommendation management system may store each of the identified plurality of sale items in a configuration list associated with the first user-defined functional requirement. As described above, each of the sale items or services to be combined in an embodiment to create a complete product or service configured especially for customers falling within a selected preset functional description may be presented within a configuration list. For example, as shown in FIG. 6, the Intel® Core' i5-6500 Processor component and 16 GB 1600 MHz DDR3L Memory component, as well as other components or services (not shown) may be combined within a configuration list that includes all components or services that combine to create an OptiPlex 3040 desktop customized for use in the engineering industry. The full configuration list for a product configured especially for customers falling within a selected preset functional description may include a plurality of sale items, each from a different product or services category table, and each associated with the selected preset functional description. For example, as shown in FIG. 6, the full configuration list for an OptiPlex 3040 desktop especially configured for use in the engineering industry may include the Intel® Core' i5-6500 Processor sale item found in a processor product and services category table, the 16 GB 1600 MHz DDR3L optimal sale item 608 found in the memory device product and services category table, and several other sale items, each of which are found in separate product and services category tables and are associated with the preset functional description requirement identifying the user's industry as engineering. A configuration list corresponding to each preset functional description requirement and/or each combination of a plurality of preset functional description requirements may be stored in memory. In such a way, the customer need-based recommendation management system may store a plurality of configuration lists of sale items, where each configuration list includes the sale items most likely to meet a specific user's needs. At this point, the flow may end. However, it is understood that the above steps may be part of an ongoing process that continues to gather data and adjust recommended sale items and service sale items as the accuracy counter variable associated with a sale item or service changes over time.

Figure 11:
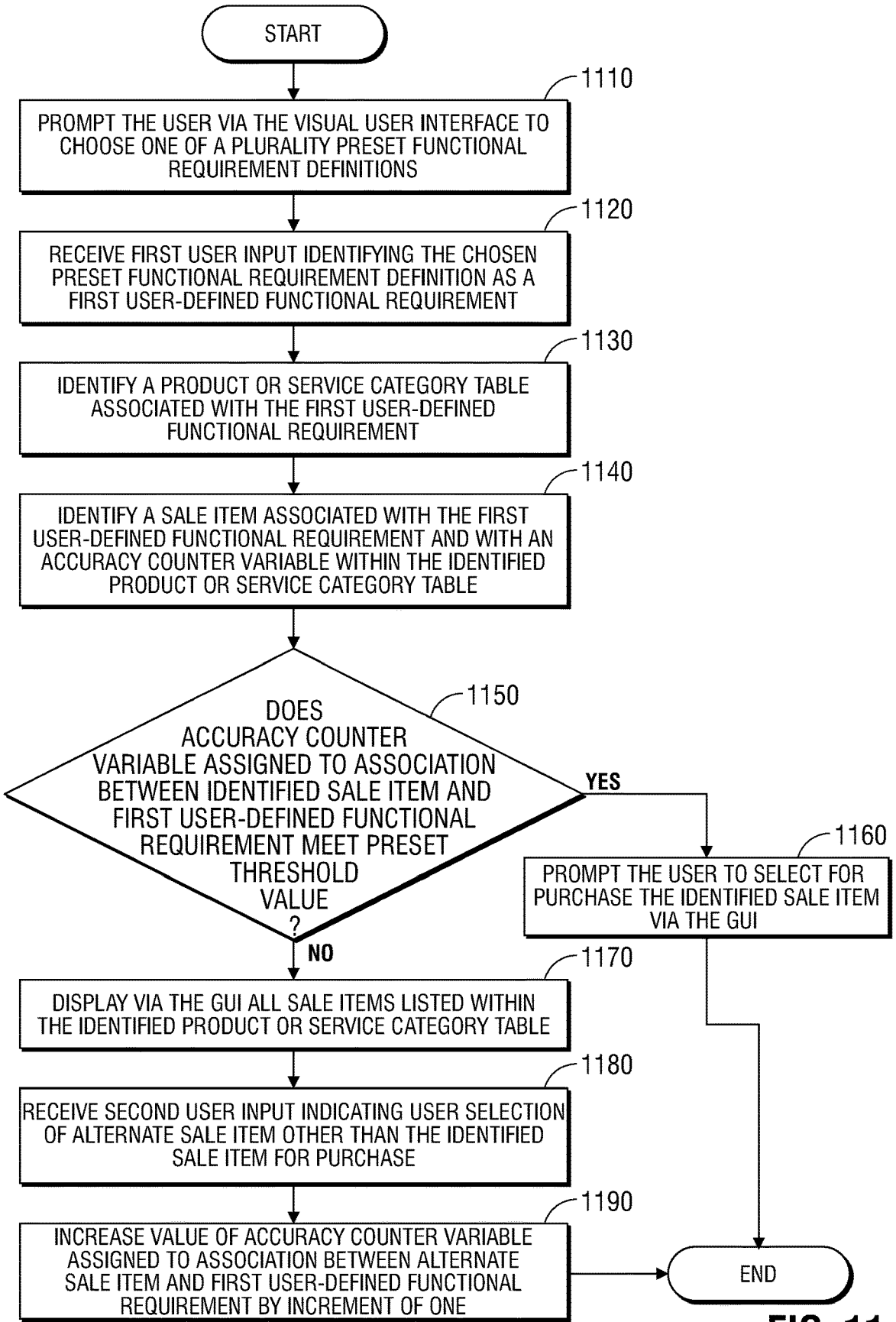
FIG. 11 is a flow chart illustrating a method of prompting a user to select for purchase an optimal sale item according to an embodiment of the present disclosure.

FIG. 11 is a flow chart illustrating a method of prompting a user to select for purchase an optimal sale item based on a user-selected functional requirement definition according to an embodiment of the present disclosure. At block 1110 in an embodiment, the user may be prompted via the GUI to choose one of a plurality of preset functional requirement definitions. As described above, each of the functional requirement definitions may be preset prior to user interaction with the GUI and may correlate to a need-based category predetermined to drive customer demand for a given sale item. For example, in an embodiment in which the GUI focuses in e-commerce of information handling systems, the preset functional requirement definitions may identify the industry or region in which the user may work. These are only two possible need-based categories that are contemplated and any other need-based categories that may be predetermined to likely drive customer demand is also contemplated, including, but not limited to user demographic information, user browser history, user activity on social media, past purchase history of the user, current user location. In some aspects, each of the above need-based categories may be broken into further subcategories in some embodiments.

The GUI in an embodiment may present each of the preset functional requirement definitions for selection by the user. For example, and as described above, the user may directly choose one or more preset functional requirement definitions via an industry select drop-down menu, and/or via a region select drop-down menu on the GUI display. In some embodiments, further sub-categories may be implemented in the drop-down menus. In alternate embodiments, the customer need-based recommendation management system may associate one or more preset functional requirement definitions with a specific user through passive observation of user characteristics. For example, and as described above, the customer need-based recommendation management system may associate one or more preset functional requirement definitions with a specific user through passive observation via identification of user location based on user IP address, accessing stored information regarding an identified user's past purchase history, or via user browser history or activity on social media.

At block 1120, in an embodiment, a first user input identifying a chosen preset functional requirement definition as a first user-defined functional requirement may be received. For example, a first user input may be received by the customer need-based recommendation management system via the GUI identifying the engineering industry as a first user-defined functional requirement. In other embodiments, and as also described above, a first user input may be received by the customer need-based recommendation management system via the GUI identifying either the entertainment, education, finance, or healthcare industries as a first user-defined functional requirement. In an aspect, some embodiments may provide for identifying subcategories to the above need-based categories and provide more specific user-defined functional requirements. A trade-off exists however in that the sub-categories may become too many requests for user input and it may be preferable to have simpler, high level need-based categories requested by the GUI. In yet other embodiments, and as also described above, a first user input may be received by the customer need-based recommendation management system via the GUI identifying one of a plurality of regions as a first user-defined functional requirement. For example, and as more specifically described above, a first user input may be received identifying NORAM (United States, Canada, and Mexico), APAC (Asia-Pacific), or IMEA (India, Middle East, Africa) as a first user-defined functional requirement.

At block 1130, in an embodiment, a product or service category table associated with the first user-defined functional requirement may be identified. As described above, in an embodiment a product or service category table may be associated with a preset functional requirement definition. Associating a product or service category table with a preset functional requirement definition may allow the customer need-based recommendation management system to only prompt the user to purchase sale items falling into product or service categories the user will likely need. For example, the memory device product or service category table may be associated with a first user-defined functional requirement identifying engineering as the user's industry, while the technical support product or service category table may not. As also described above, the lack of association between the technical support product or service category table and the engineering industry in an embodiment may, for example, reflect a lack of demand for technical support in information handling systems sold to engineers.

At block 1140, in an embodiment, a sale item associated with the first user-defined functional requirement within the identified product or service category table may be identified. As described above, in order to instruct the GUI to display information that allows the user to choose a specific sale item or service within each category of products or services available, the customer need-based recommendation management system in an embodiment may generate, access, and maintain one or more product or service category tables containing a list of each sale item available for purchase within any given category of products or services. As an example, and as described above, the customer need-based recommendation management system in an embodiment may generate, access, and maintain a memory device product or services category table containing a list of each memory device sale item available for purchase, or a technical support product or services category table containing a list of each technical support package sale item available for purchase. These are only two examples of product or service category tables, and other aspects of an embodiment may include a product or service category for each available component category or sale item type (e.g. processors, memory devices, operating systems, software applications, and compatible peripheral devices) and/or for each service category or sale item type (e.g. computer security services, technical support services, or warranty programs). As also described above, although the examples described directly above illustrate sale items and services relating to information handling systems, products and services relating to any type of sale items or services are contemplated.

As also described above, each sale item listed within a product or service category table may be the same sale item type, and may be associated with one or more preset functional requirement definitions. An optimal sale item, most likely to meet a specific customer's needs may be determined by identifying one or more sale items associated with the received first user-defined functional requirement within that table. By identifying one or more sale items associated with the received first user-defined functional requirement, the customer need-based recommendation management system in an embodiment may identify the optimal sale item within that product or service category for that specific user. For example, and as described above, in an embodiment in which a first user input identifying the engineering industry as a first user-defined functional requirement is received via the GUI, the customer need-based recommendation management system may identify a sale item that is a memory device type sale item. Within the memory device product or service category table, the optimal sale item for that user is identified as a 16 GB memory device.

At block 1150, in an embodiment, the customer need-based recommendation management system may determine whether the accuracy counter variable assigned to the association between the identified sale item and the first user-defined functional requirement meets a preset threshold value. As described above, in order to assess the accuracy of each recommendation based upon user needs, the customer-need based recommendation management system in an embodiment may assign an accuracy counter variable, indicating the relative accuracy of a recommendation, to each association between a sale item and one or more functional requirement definitions. As also described above, the customer-need based recommendation management system in an embodiment may also adjust the accuracy counter variable assigned to each association between a sale item and one or more functional requirement definitions in response to observed user purchase activities. If no or few purchase activities have been observed, the accuracy of each recommendation may be too low to rely on for the determination of an optimal sale item. As such, the customer need-based recommendation management system may only rely on the accuracy of a recommendation if enough instances of user purchase activity have been recorded. In other words, the customer need-based recommendation management system may only recommend an identified sale item for a user who has selected a first user-defined functional requirement if the accuracy counter variable assigned to the association between the identified sale item and the first user-defined functional requirement meets a preset threshold value. A preset threshold value may have any number, but may be for example, 5 K. If the accuracy counter variable assigned to the association between the identified sale item and the first user-defined functional requirement meets a preset threshold value, the method may proceed to block 1160. However, if the accuracy counter variable assigned to the association between the identified sale item and the first user-defined functional requirement does not meet a preset threshold value, the method may move to block 1170.

At block 1160, in an embodiment, if the accuracy counter variable assigned to the association between the identified sale item and the first user-defined functional requirement meets a preset threshold value, the user may be prompted to select for purchase the identified sale item via the GUI. As described above, the customer need-based recommendation management system may configure the GUI to display one or more recommended sale items, chosen based on the determination of that user's needs. The customer need-based recommendation management system in an embodiment may display such a recommended sale item for one or more of multiple categories of products or services available for purchase via the GUI. For example, as described in greater detail above, the customer need-based recommendation management system in an embodiment may receive user input indicating the user has chosen to purchase a new OptiPlex 3040 Small Form Factor information handling system, and has chosen the "engineering" preset functional requirement definition from the industry select pull-down menu to describe her industry. As also described in greater detail above, the customer need-based recommendation management system in such an embodiment may associate the "engineering" preset functional requirement definition with, and consequently prompt the user to purchase, the Intel® Core' i5-6500 Processor, and the 16 GB 1600 MHz DDR3L as the optimal sale items.

At block 1170, in an embodiment, the customer need-based recommendation management system may configure the GUI to display all sale items listed within the identified product or service category table if the accuracy counter variable assigned to the association between the identified sale item and the first user-defined functional requirement does not meet a preset threshold value. Because in this scenario, the customer need-based recommendation management system has not gathered enough information about customer purchasing history to reliably recommend a sale item to meet a particular customer's needs as indicated the user's selection of the first user-defined functional requirement definition, the customer need-based recommendation management system may display all possible options of sale items of a specific sale item type in order to allow the user to choose the sale item within that type or category most likely to meet her needs. For example, and as described above, the customer need-based recommendation management system in an embodiment may display an optimal sale item, such as an 8 GB memory device, and one or more non-optimal sale items, such as 4 GB and 16 GB memory devices in order to allow a user who has identified her industry as healthcare to choose which of these three memory devices will most likely meet her needs.

At block 1180, in an embodiment, the customer need-based recommendation management system may receive a second user input indicating a user selection of an alternate sale item, other than the identified sale item for purchase. As described above, the customer need-based recommendation management system may display all possible options of sale items of a specific sale item type in order to allow the user to choose the sale item within that type or category most likely to meet her needs. By observing which one of these sale items she chooses, the customer need-based recommendation management system in an embodiment may determine which sale items to recommend to other customers who also select the same first user-defined functional requirement definition. For example, the customer need-based recommendation management system in an embodiment may receive a second user input indicating a user who has identified her industry as healthcare has selected a 4 GB memory device for purchase. In such an embodiment, by observing or recording this purchase history, the customer need-based recommendation management system may better determine which sale items to recommend to other customers who identify their industry as healthcare in the future.

At block 1190, in an embodiment, the customer need-based recommendation management system may increase the value of the accuracy counter variable assigned to the association between the alternate sale item and the first user-defined functional requirement definition by an increment of one. As described above, by observing which one of these sale items she chooses, the customer need-based recommendation management system in an embodiment may determine which sale items to recommend to other customers who also select the same first user-defined functional requirement definition. The customer need-based recommendation management system in an embodiment may better determine which sale items to recommend to other customers who also select the same first user-defined functional requirement definition by increasing the value of the accuracy counter variable assigned to the association between the alternate sale item and the first user-defined functional requirement definition by an increment of one.

For example, by increasing the value of the accuracy counter variable assigned to the association between the 4 GB memory device and the user's identification of her industry as healthcare, the customer need-based recommendation management system in an embodiment may increase the chances of recommending the 4 GB memory device to another customer who identifies her industry as healthcare in the future. In such a way, the customer need-based recommendation management system may heuristically adapt its recommendations to reflect actual user purchase activities. In addition, by gathering more information about the sale items most likely to be purchased by users falling into certain need-based categories, the customer need-based recommendation management system may provide sales metrics merchants can use to guide product development and target advertising campaigns toward higher profit strategies. At this point flow may end, but ongoing processes may occur pursuant to the above method to continue to provide additional accuracy for selection of optimal sale items in aspects of the present embodiments.

Figure 12:
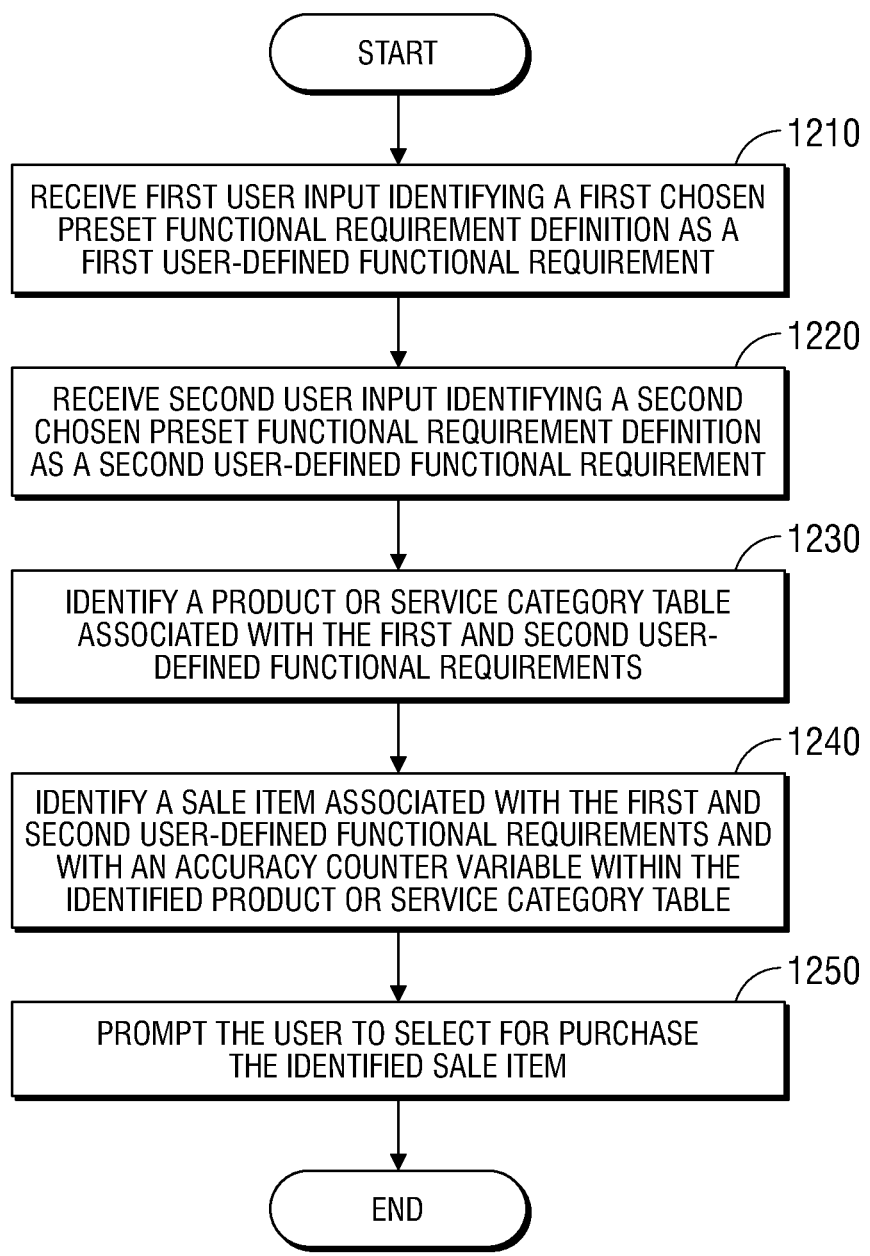
FIG. 12 is a flow chart illustrating a method of prompting a user to select for purchase an optimal sale item according to an embodiment of the present disclosure.

FIG. 12 is a flow chart illustrating a method of prompting a user to select for purchase an optimal sale item as part of an overall information handling system or services package based on a combination of user-selected functional requirement definitions according to an embodiment of the present disclosure. At block 1210, in an embodiment, a first user input identifying a first chosen preset functional requirement definition as a first user-defined functional requirement may be received. For example, as described in greater detail above, a first user input may be received by the customer need-based recommendation management system via the GUI identifying the healthcare industry as a first user-defined functional requirement. As another example, and as also described in greater detail above, a first user input may be received by the customer need-based recommendation management system via the GUI identifying the entertainment industry as a first user-defined functional requirement. In yet other embodiments, and as also described above, a first user input may be received by the customer need-based recommendation management system via the GUI identifying either the education, finance, or engineering industries as a first user-defined functional requirement.

At block 1220, in an embodiment, a second user input identifying a second chosen preset functional requirement definition as a second user-defined functional requirement may be received. For example, as described in greater detail above, in an embodiment in which the first user input identified the healthcare industry as the first user-defined functional requirement, a second user input may be received by the customer need-based recommendation management system via the GUI identifying the NORAM (United States, Canada, Mexico) region as the second user-defined functional requirement. As another example, and as also described above, in an embodiment in which the first user input identified the entertainment industry as the first user-defined functional requirement, a second user input may be received by the customer need-based recommendation management system via the GUI also identifying the NORAM (United States, Canada, Mexico) region as the second user-defined functional requirement. A second, user-defined functional requirement could instead be a sub-category of an industry need-based category according to some embodiments as well.

At block 1230, in an embodiment, a product or service category table associated with the first and second user-defined functional requirements may be identified. As described above, associating a product or service category table with a plurality of preset functional requirement definitions may allow the customer need-based recommendation management system to only prompt the user to purchase sale items falling into product or service categories the user will likely need. For example, and as also described above, the NORAM and APAC regions may be associated with both the memory device product or service category table and the technical support memory device product or service category table, but the memory device product or service category table may be associated with a first user-defined functional requirement identifying engineering as the user's industry, while the technical support product or service category table may not. As also described above, the lack of association between the technical support product or service category table and the engineering industry in an embodiment may, for example, reflect a lack of demand for technical support in information handling systems sold to engineers who may be capable of performing their own technical support.

At block 1240, in an embodiment, a sale item associated with both the first and second user-defined functional requirements within the identified product or service category table may be identified. As described above, each sale item listed within a product or service category table may be associated with one or more preset functional requirement definitions in order to identify the optimal sale item for a given customer. An optimal sale item may be determined by identifying one or more sale items within a product or services category table associated with both the first and second user-defined functional requirements. By identifying one or more sale items associated with both of these first and second user-defined functional requirements, the customer need-based recommendation management system in an embodiment may identify the optimal sale item within that product or service category for that specific user. Identification of sale items may be made pursuant to the highest accuracy counter variable values assigned as determined from each of the first and second user defined functional definitions. In some aspects, the highest average accuracy counter variable value may be selected. In other aspects, the highest accuracy counter variable value between the two user defined functional definitions may be selected. It is contemplated that selection may further apply other criteria which determined the overall highest accuracy counter variable value between the two (or more) user defined functional definitions for a sale item type.

For example, as described in greater detail above, the customer-need based recommendation management system in an embodiment may associate the 16 GB memory device costing $260 with users working in the healthcare industry in the NORAM (U.S., Canada, Mexico) region. This association may be based on a determination that users working in the North American healthcare system need information handling systems capable of handling high-resolution diagnostic images while simultaneously networking with several backend databases storing and organizing patient information. In contrast, and as described above, the customer-need based recommendation management system in an embodiment may associate the 8 GB memory device costing $130 with users working in the same industry in the Asia-Pacific region. This association may be based on a determination that users working in the Asia-Pacific region healthcare industry need not communicate with as many backend databases and/or do not routinely access a high volume of high-resolution diagnostic images, and that a less expensive memory device will likely meet such a user's needs. In such a way, the customer need-based recommendation management system in an embodiment may more accurately gauge the appropriate sale item for each user based on the selection of multiple functional requirement descriptions.

At block 1250, in an embodiment, the user may be prompted to select for purchase the identified sale item via the GUI. For example, as described in greater detail above, the customer need-based recommendation management system in an embodiment may receive user input indicating the user has chosen to purchase a new OptiPlex 3040 Small Form Factor information handling system, has chosen the "healthcare" preset functional requirement definition from the industry select pull-down menu to describe her industry, and has chosen the "NORAM" preset functional requirement definition from the region select pull-down menu to describe her region. As also described in greater detail above, the customer need-based recommendation management system in such an embodiment may associate both the "healthcare" preset functional requirement definition, and the "NORAM" preset functional requirement definition with, and consequently prompt the user to purchase the 16 GB 1600 MHz DDR3L as the optimal memory device sale item.

As another example, and as also described in greater detail above, the customer need-based recommendation management system in an embodiment may receive user input indicating the user has chosen to purchase a new OptiPlex 3040 Small Form Factor information handling system, has chosen the "entertainment" preset functional requirement definition from the industry select pull-down menu to describe her industry, and has chosen the "NORAM" preset functional requirement definition from the region select pull-down menu to describe her region. As also described in greater detail above, the customer need-based recommendation management system in such an embodiment may associate both the "entertainment" preset functional requirement definition, and the "NORAM" preset functional requirement definition with, and consequently prompt the user to purchase the three year ProSupport PLUS with next business day onsite service as the optimal technical support sale item. At this point the process may end and a sale may be executed.

Figure 13:
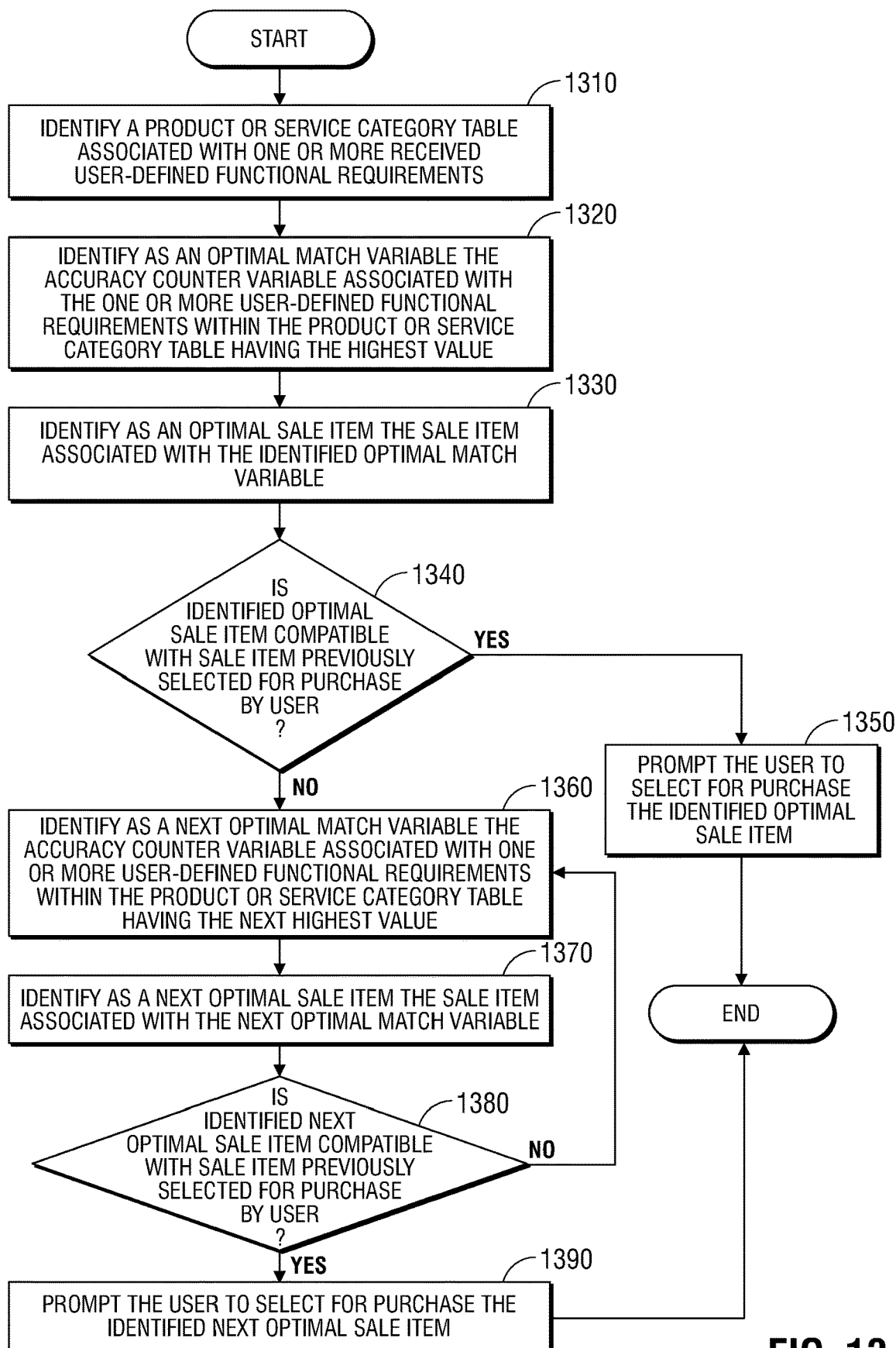
FIG. 13 is a flow chart illustrating a method of prompting a user to select for purchase a next optimal sale item according to an embodiment of the present disclosure.

FIG. 13 is a flow chart illustrating a method of prompting a user to select for purchase a next optimal sale item as part of an overall information handling system and service package based on compatibility concerns according to an embodiment of the present disclosure. At block 1310, in an embodiment, a product or service category table associated with one or more received user-defined functional requirements may be identified. In an embodiment, a product or service category table may be associated with one or more preset functional requirement definitions, allowing the customer need-based recommendation management system to only prompt the user to purchase sale items falling into product or service categories the user will likely need.

At block 1320, in an embodiment, the accuracy counter variable associated with the one or more user-defined functional requirements within the product or service category table having the highest accuracy counter variable value may be identified as an optimal match variable. For example, as described above, in an embodiment in which the user has selected for purchase a new OptiPlex 3040 Small Form Factor information handling system, the customer need-based recommendation management system the customer need-based recommendation management system may identify the accuracy counter variable value 40 K as the optimal match variable. The accuracy counter variable value of 40 K is associated within the memory devices product or service category table with the first user-defined functional requirement identifying healthcare as the user's industry, and associated with the second user-defined functional requirement identifying NORAM (United States, Canada, Mexico) as the user's region. In contrast, and as another example, in an embodiment in which the user has selected for purchase a new OptiPlex 3040 Small Form Factor information handling system, the customer need-based recommendation management system the customer need-based recommendation management system may identify the accuracy counter variable value of 30 K which is associated within the memory devices product or service category table with the first user-defined functional requirement identifying healthcare as the user's industry, and associated with the second user-defined functional requirement identifying APAC (Asia-Pacific) as the user's region as the optimal match variable.

At block 1330, the sale item associated with the identified optimal match variable may be identified as the optimal sale item. For example, as described above, in an embodiment in which the user has selected for purchase a new OptiPlex 3040 Small Form Factor information handling system, and the accuracy counter variable value 40 K has been identified as the optimal match variable in the memory device product and service category table, the customer need-based recommendation management system may identify the 4 GB memory device associated with the accuracy counter variable value 40 K in the memory device product and service category table as the optimal sale item. As another example, and as also described above, in an embodiment in which the user has selected for purchase a new OptiPlex 3040 Small Form Factor information handling system, and the accuracy counter variable 30 K has been identified as the optimal match variable in the memory device product and service category table, the customer need-based recommendation management system may identify the 8 GB memory device associated with the accuracy counter variable value 30 K in the memory device product and service category table as the optimal sale item.

At block 1340, it may be determined whether the identified optimal sale item is compatible with the sale item previously selected for purchase by the user. In order to ensure the recommended sale item is compatible with other sale items the user has selected for purchase, the customer need-based recommendation management system in an embodiment may associate one or more compatibility options with each sale item listed in a product or service category table. The customer need-based recommendation management system in an embodiment may then only prompt a user to purchase an optimal sale item that is also associated with a compatible option that includes the sale item the user has previously selected for purchase.

For example, in an embodiment in which the customer need-based recommendation management system has identified the 8 GB memory device associated with the accuracy counter variable 30 K in the memory device product and service category table as the optimal sale item for a user who has also selected for purchase a new OptiPlex 3040 Small Form Factor information handling system, the customer need-based recommendation management system may also reference the "compatibility option" column of the memory devices product or service category table to identify that the OptiPlex 3040 Desktop device is listed as a compatible option for the identified 8 GB optimal memory device sale item. As another example, and as also described above, in an embodiment in which the customer need-based recommendation management system has identified the 4 GB memory device associated with the accuracy counter variable 40 K in the memory device product and service category table as the optimal sale item for a user who has also selected for purchase a new OptiPlex 3040 Small Form Factor information handling system, the customer need-based recommendation management system may also reference the "compatibility option" column of the memory devices product or service category table to determine that the OptiPlex 3040 Desktop device is not listed as a compatible option for the identified 4 GB optimal memory device sale item.

At block 1350, if the identified optimal sale item is determined to be compatible with the sale item previously selected for purchase by the user, the user may be prompted to select for purchase the identified optimal sale item. For example, in an embodiment in which the customer need-based recommendation management system determines that the OptiPlex 3040 Desktop device the user has previously selected for purchase is listed as a compatible option for the identified 8 GB optimal memory device sale item, the customer need-based recommendation management system may instruct the GUI to display only the identified 8 GB optimal memory device in order to prompt the user to select it for purchase.

At block 1360, if the identified optimal sale item is determined to not be compatible with the sale item previously selected for purchase by the user, the accuracy counter variable having the next highest value and also being associated with the one or more user-defined functional requirements may be identified as a next optimal match variable. For example, in an embodiment in which the customer need-based recommendation management system determines that the OptiPlex 3040 Desktop device the user has previously selected for purchase is not listed as a compatible option for the identified 4 GB optimal memory device sale item, the customer need-based recommendation management system may identify the accuracy counter variable 20 K as the accuracy counter variable having the next highest value to the accuracy counter variable 40 K and being associated within the memory devices product or service category table with both the first user-defined functional requirement identifying healthcare as the user's industry, and associated with the second user-defined functional requirement identifying NORAM (United States, Canada, Mexico) as the user's region. The customer need-based recommendation management system in such an embodiment may identify the accuracy counter variable value 20 K as the next optimal match variable.

At block 1370, in an embodiment, the sale item associated with the next optimal match variable may be identified as a next optimal sale item. For example, and as described in greater detail above, in an embodiment in which the accuracy counter variable 20 K has been identified as the next optimal match variable, the customer need-based recommendation management system may identify the 16 GB memory device as the next optimal sale item. In such a way, the customer need-based recommendation management system may avoid recommending the user purchase a memory device that is not compatible with the processor or other sale item the user has already selected for purchase.

At block 1380, in an embodiment, the customer need-based recommendation management system may determine whether the next optimal sale item is compatible with the one or more sale items previously selected for purchase by the user. As described above, the customer need-based recommendation management system in an embodiment may only prompt a user to purchase a sale item that is associated with a compatibility option that includes the sale item or items the user has previously selected for purchase, in order to ensure the recommended sale item is compatible with other sale items the user has selected for purchase. For example and as described above, in an embodiment in which the customer need-based recommendation management system has identified the 16 GB memory device as the next optimal sale item for a user who has also selected for purchase a new OptiPlex 3040 desktop device, the customer need-based recommendation management system may also reference the "compatibility option" column of the memory devices product or services category table to identify that the OptiPlex 3040 Desktop device is listed as a compatible option for the identified 16 GB next optimal memory device sale item. Cross-reference to other sale items for compatibility may be made as well, such as reference to a processor type, storage device type, or others. If the customer need-based recommendation management system determines the next optimal sale item is compatible with the one or more sale items previously selected for purchase by the user, the method may proceed to block 1390. However, if the customer need-based recommendation management system determines the next optimal sale item is not compatible with at least one sale item previously selected for purchase by the user, the method may return to block 1360, and another next optimal match variable may be identified.

At block 1390, in an embodiment, the user may be prompted to select for purchase the identified next optimal sale item. For example, as described in greater detail above, in an embodiment in which the customer need-based recommendation management system determines that the OptiPlex 3040 Desktop device the user has previously selected for purchase is listed as a compatible option for the identified 16 GB next optimal memory device sale item, the customer need-based recommendation management system may instruct the GUI to display only the identified 16 GB optimal memory device in order to prompt the user to select it for purchase. At this point the process may end, but additional aspects may continue with the selection of other sale items for the information handling system or services. Further, pursuant to embodiments herein, ongoing maintenance of the accuracy variable value levels to associate sale items with user need-based categories may continue to be conducted by the customer need-based recommendation management system.

Figure 14:
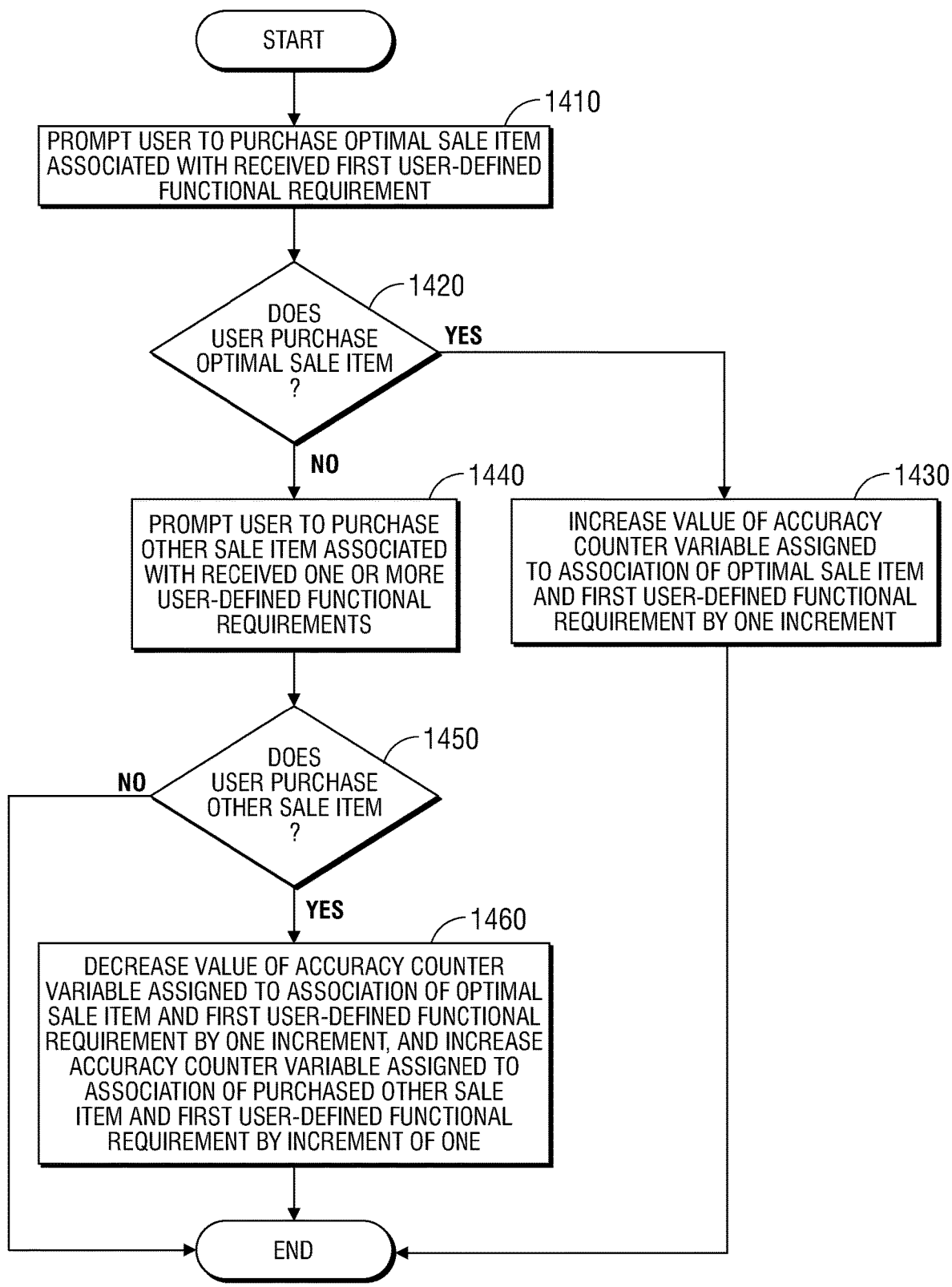
FIG. 14 is a flow chart illustrating a method of heuristically adapting an accuracy counter variable according to an embodiment of the present disclosure.

FIG. 14 is a flow chart illustrating a method of heuristically adapting an accuracy counter variable assigned to an association of a sale item with a preset functional requirement definition according to an embodiment of the present disclosure. At block 1410, in an embodiment, a user may be prompted to purchase an optimal sale item associated with a first user-defined functional requirement. As described in greater detail above, the customer need-based recommendation management system may configure the GUI to display one or more recommended sale items most likely to meet that specific customer's needs. The customer need-based recommendation management system in an embodiment may select such a recommended sale item for one or more of multiple categories of products or services available for purchase via the GUI. For example, as described in greater detail above, the customer need-based recommendation management system in an embodiment may receive user input indicating the user has chosen to purchase a new OptiPlex 3040 Small Form Factor information handling system, and has chosen the "healthcare" preset functional requirement definition from the industry select pull-down menu to describe her industry. As also described in greater detail above, the customer need-based recommendation management system in such an embodiment may associate the "healthcare" preset functional requirement definition with, and consequently prompt the user to purchase, the Intel® Core™ i5-6500 Processor, the 8 GB 1600 MHz DDR3L, and other components as the optimal sale items.

At block 1420, in an embodiment, it may be determined whether the user purchases the prompted optimal sale item. As described above, in order to assess the accuracy of each recommendation based upon user needs, the customer-need based recommendation management system in an embodiment may assign an accuracy counter variable, indicating the relative accuracy of a recommendation, to each association between a sale item and each functional requirement definition or combination of functional requirement definitions. As also described above, the customer-need based recommendation management system in an embodiment may also adjust the accuracy counter variable assigned to each association between a sale item and one or more functional requirement definitions in response to observed user purchase activities.

A user's purchase of a recommended optimal sale item may be an indication that the association between the recommended sale item and the user-selected functional description requirement is relatively more accurate than previously determined. In contrast, a user's purchase of a non-recommended item instead of the recommended optimal sale item may be an indication that the association between the recommended sale item and the user-selected functional description requirement is relatively less accurate than previously determined. At block 1420, in an embodiment, the customer need-based recommendation management system in an embodiment may receive input indicating when either of these scenarios occurs, and may then adjust the accuracy counter variable associated with the association between the recommended sale item and the one or more functional requirement definitions accordingly in order to provide more precise measurement of the relative accuracy of the determination that the recommended sale item may meet the needs of a user meeting those one or more user-selection functional requirement definitions.

At block 1430, in an embodiment in which the user purchases the recommended optimal sale item, the value of the accuracy counter variable associated with the optimal sale item and the one or more predetermined functional requirement definitions chosen by the user may be increased by one increment. As described above, a user's purchase of a recommended optimal sale item may be an indication that the association between the recommended sale item and the user-selected functional description requirement is relatively more accurate than previously determined. As a consequence, the customer need-based recommendation management system may increase the value of the accuracy counter associated with that determination in order to increase the chance of recommending this sale item in a similar scenario in the future. In this way, the customer need-based recommendation management system may heuristically adapt the accuracy counter variable associated with the recommended optimal sale item and a user-selected functional description according to user purchase activities. The customer need-based recommendation management system may thus heuristically adapt the recommendations made to any given user, based on user-defined descriptions of functional need.

At block 1440, in an embodiment in which the user does not purchase the recommended optimal sale item, the user may be prompted to purchase another sale item within the same product or service category table as the optimal sale item that is also associated with the received one or more user-defined functional requirements. As described in greater detail above, in an embodiment in which the user who has identified healthcare as her industry does not purchase the 8 GB 1600 MHz DDR3L Memory optimal sale item, the user may be prompted to purchase either the 16 GB or 4 GB non-optimal sale items that are also associated with the healthcare industry preset functional requirement description in the memory device product or service category table.

At block 1450, in an embodiment, it may be determined whether the user chooses to purchase one of the other (non-optimal) sale items. If the user chooses to purchase one of the non-optimal sale items, it may be an indication to the customer need-based recommendation management system that the previously determined "optimal sale item" may not, in fact, be the optimal sale item for a user meeting the preset functional requirement definitions provided. For example, if the user who has identified healthcare as her industry chooses to purchase the "non-optimal" 4 GB memory device instead of the "optimal" 8 GB memory device, this may indicate to the customer need-based recommendation management system that the 8 GB memory device may not, in fact, be the optimal memory device sale item for a user in the healthcare industry. If the user purchases the other sale item at block 1450, the method may proceed to 1460 in order to adjust the value of the accuracy counter variable to reflect the perceived change in accuracy of such a determination.

In contrast, if the user chooses not to purchase one of the other (non-optimal) sale items, the method may end. A user's choice not to purchase either the optimal or the non-optimal sale items may be an indication to the customer need-based recommendation system that the customer chose not to purchase the optimal sale item for reasons not related to the accuracy of the determination of the optimal sale item. For example, a user may choose not to purchase any of the recommended memory devices in a circumstance in which the customer decided not to purchase a information handling system at all, the customer could not afford any of the memory devices presented, or the customer was just "window shopping" to compare prices. None of these scenarios reflect the accuracy of the determination that the 8 GB memory device is the optimal sale item for a user in the healthcare industry. As such, the method in such a scenario does not move on to adjust the value of the accuracy counter variable associated with the optimal sale item.

At block 1460, in an embodiment, the value of the accuracy counter variable associated with the optimal sale item and the one or more predetermined functional requirement definitions chosen by the user may be increased by one increment and the value of the accuracy counter variable assigned to the association between the purchased sale item and the received user-defined functional requirements may be increased by an increment of one. As described above, a user's purchase of a recommended optimal sale item may be an indication that the association between the recommended sale item and the user-selected functional description requirement is relatively more accurate than previously determined.

By decreasing the accuracy counter variable assigned to the association between the optimal sale item and the user-selected functional requirement, the customer need-based recommendation management system may decrease the likelihood of recommending the optimal sale item to a customer meeting the same functional requirement definition in the future. In this way, the customer need-based recommendation management system may heuristically adapt the accuracy counter variable associated with the recommended optimal sale item and a user-selected functional description requirement according to user purchase activities. In contrast, by increasing the accuracy counter variable assigned to the association between the purchased other sale item and the user-selected functional requirement definition, the customer need-based recommendation management system increases the chance of recommending the sale item the customer actually purchased for users meeting the same functional requirement descriptions in the future. In this way, the customer need-based recommendation management system may heuristically adapt the accuracy counter variable assigned to the association of a user-defined functional requirement definition and a sale item proven to meet such a customer's needs. The customer need-based recommendation management system heuristically adapts the recommendations made to any given user based on user-defined descriptions of functional need. Although the process may end at this point, ongoing heuristic definition of sale items associated with need-based categories continues within the customer need-based recommendation management system.

The blocks of the flow diagrams discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a customer need-based configuration recommendation management system to enhance configuration selection for a custom information handling system build comprising:

a processor executing machine readable executable code instructions of the customer need-based configuration recommendation management system to define a plurality of preset user functional requirement definitions for a configuration of one or more sale items to configure components and software for an on-sale custom information handling system build available via a web interface, wherein the each of the plurality of preset user functional definitions corresponds to one of a plurality of need-based categories of customers relating to operating capabilities of the custom information handling system;

a memory to store a plurality of list configurations used with information handling systems, each of the plurality of list configurations including a configuration of sale items of components and software associated with one of the plurality of preset user functional definitions, wherein each of the sale items have different sale item types of components and software from one another and are identified as being compatible with one another according to component and software compatibility data for a custom information handling system build stored in memory; and a configurator for a user-selected need-based category to present one of the plurality of list configurations for information handling systems including a configuration of sale items of components and software associated with the first functional requirement definition for the user-selected need-based category and prompt the user to select for purchase the presented sale item component or software for inclusion in the custom information handling system build;

wherein one of the plurality of sale items of components and software within the presented stored list configuration for information handling systems having a first item type is associated with an accuracy counter variable having a higher value in comparison to a plurality of accuracy counter variables associated with other sale items not within the presented stored list configuration having the first sale item type.

2. The information handling system operating the customer need-based recommendation management system of claim 1 wherein the first sale item type includes a plurality of central processing units.

3. The information handling system operating the customer need-based recommendation management system of claim 1, wherein one of the plurality of sale items of components and software within the presented stored list configuration for information handling systems having a second item type is associated with an accuracy counter variable having a higher value in comparison to a plurality of accuracy counter variables associated with other sale items of components and software not within the presented stored list configuration for information handling systems having the second sale item type.

4. The information handling system operating the customer need-based recommendation management system of claim 1 wherein the second sale item type includes a plurality of memory options.

5. The information handling system operating the customer need-based recommendation management system of claim 1 wherein the corresponding need-based category for preset functional requirement definitions is a user industry.

6. The information handling system operating the customer need-based recommendation management system of claim 1 wherein the corresponding need-based category for preset functional requirement definitions is a user geographic location.

* * * * *